(12) United States Patent
Huang et al.

(10) Patent No.: US 10,396,952 B2
(45) Date of Patent: Aug. 27, 2019

(54) WIRELESS DEVICE, METHOD, AND COMPUTER READABLE MEDIA FOR MULTIPLY-USER REQUEST-TO-SEND AND CLEAR-TO-SEND AND UPLINK ACK PROTECTION IN A HIGH EFFICIENCY WIRELESS LOCAL-AREA NETWORK

(71) Applicant: Intel IP Corporation, Santa Clara, CA (US)

(72) Inventors: Po-Kai Huang, West Lafayette, IN (US); Qinghua Li, San Ramon, CA (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 538 days.

(21) Appl. No.: 14/669,810

(22) Filed: Mar. 26, 2015

(65) Prior Publication Data

US 2016/0164652 A1    Jun. 9, 2016

Related U.S. Application Data

(60) Provisional application No. 62/087,027, filed on Dec. 3, 2014.

(51) Int. Cl.
*H04W 72/08*   (2009.01)
*H04B 7/04*    (2017.01)
(Continued)

(52) U.S. Cl.
CPC .......... *H04L 5/0048* (2013.01); *H04L 5/0007* (2013.01); *H04L 5/0037* (2013.01);
(Continued)

(58) Field of Classification Search
CPC ... H04L 5/0048; H04L 5/0055; H04L 5/0007; H04L 5/0057; H04W 72/0413; H04W 72/082
See application file for complete search history.

(56) References Cited

U.S. PATENT DOCUMENTS

| | | | |
|---|---|---|---|
| 2008/0232490 A1* | 9/2008 | Gross | H04L 5/0037 375/260 |
| 2011/0090855 A1* | 4/2011 | Kim | H04B 7/0452 370/329 |

(Continued)

*Primary Examiner* — Un C Cho
*Assistant Examiner* — Voster Preval
(74) *Attorney, Agent, or Firm* — Schwegman Lundberg & Woessner, P.A.

(57) ABSTRACT

Wireless device, method, and computer readable media for multi-user request-to-send and clear-to-send and uplink ACK protection in a high efficiency wireless local-area network are disclosed. A high-efficiency (HE) wireless local-area network (HEW) master device may include circuitry configured to generate a multi-user (MU) RTS packet for a plurality of stations (STAs), the RTS packet to include an indication of an address for each of the plurality of STAs. The circuitry may be further configured to transmit the MU-RTS to the plurality STAs and transmit data to one or more of the plurality of STAs in accordance with at least from the following group orthogonal frequency division multi-user (OFDMA) and multi-user multiple-input multiple-output (MU-MIMO). The circuitry may be configured to receive acknowledgements from the one or more of the plurality of STAs. A HEW device may set a deferral duration in an uplink transmission to enable a HEW master device to send an acknowledgement.

21 Claims, 15 Drawing Sheets

(51) Int. Cl.
*H04L 5/00* (2006.01)
*H04W 74/08* (2009.01)
*H04B 7/0452* (2017.01)
*H04W 84/12* (2009.01)
*H04W 72/04* (2009.01)

(52) U.S. Cl.
CPC ....... *H04L 5/0055* (2013.01); *H04W 74/0816* (2013.01); *H04B 7/0452* (2013.01); *H04W 72/0453* (2013.01); *H04W 84/12* (2013.01)

(56) References Cited

U.S. PATENT DOCUMENTS

| | | | |
|---|---|---|---|
| 2011/0188598 A1* | 8/2011 | Lee | H04B 7/0452 375/267 |
| 2011/0194644 A1* | 8/2011 | Liu | H04L 5/0023 375/295 |
| 2012/0120907 A1* | 5/2012 | Kishigami | H04B 7/0697 370/329 |
| 2012/0307696 A1* | 12/2012 | Morioka | H04W 74/085 370/310 |
| 2013/0229996 A1* | 9/2013 | Wang | H04W 72/0413 370/329 |
| 2015/0172012 A1* | 6/2015 | Abeysekera | H04J 1/00 370/329 |
| 2016/0100408 A1* | 4/2016 | Hedayat | H04L 65/4076 370/329 |
| 2016/0128057 A1* | 5/2016 | Seok | H04L 5/0055 370/329 |
| 2016/0338105 A1* | 11/2016 | Wu | H04W 74/0816 |
| 2017/0019818 A1* | 1/2017 | Xing | H04B 7/00 |

* cited by examiner

WIRELESS DEVICE, METHOD, AND COMPUTER READABLE MEDIA FOR MULTIPLY-USER REQUEST-TO-SEND AND CLEAR-TO-SEND AND UPLINK ACK PROTECTION IN A HIGH EFFICIENCY WIRELESS LOCAL-AREA NETWORK

PRIORITY CLAIM

This application claims the benefit of priority under 35 USC 119(e) to U.S. Provisional Patent Application Ser. No. 62/087,027, filed Dec. 3, 2014, which is incorporated herein by reference in its entirety.

TECHNICAL FIELD

Some embodiments relate to wireless local area networks (WLANs) including networks operating in accordance with Institute of Electrical and Electronic Engineers (IEEE) 802.11ax. Some embodiments relate to high-efficiency (HE) wireless or high-efficiency WLAN (HEW) communications. Some embodiments relate to downlink orthogonal frequency division multiple access (OFDMA) and/or multi-user multiple-input multiple-output (MU-MIMO) where a multiple-user (MU) request to send (RTS) is sent by a master station. Some embodiments relate to uplink OFDMA and/or MU-MIMO where a duration field indicates a deferral time for devices not participating in the uplink OFDMA and/or MU-MIMO.

BACKGROUND

One issue in wireless local area networks (WLANs) is efficiently using the wireless network. Often there may be many devices sharing the wireless medium and it may be difficult to determine how to share the wireless medium. Moreover, often when wireless devices transmit at the same time they may interfere with one another. Additionally, the wireless network may support different protocols including legacy protocols.

Thus, there are general needs for systems and methods for efficiently using the wireless medium, and in particularly, to determine how to lessen the frequency when wireless devices transmit at the same time and interfere with one another.

BRIEF DESCRIPTION OF DRAWINGS

The present disclosure is illustrated by way of example, and not limitation, in the figures of the accompanying drawings, in which like references indicate the same or similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
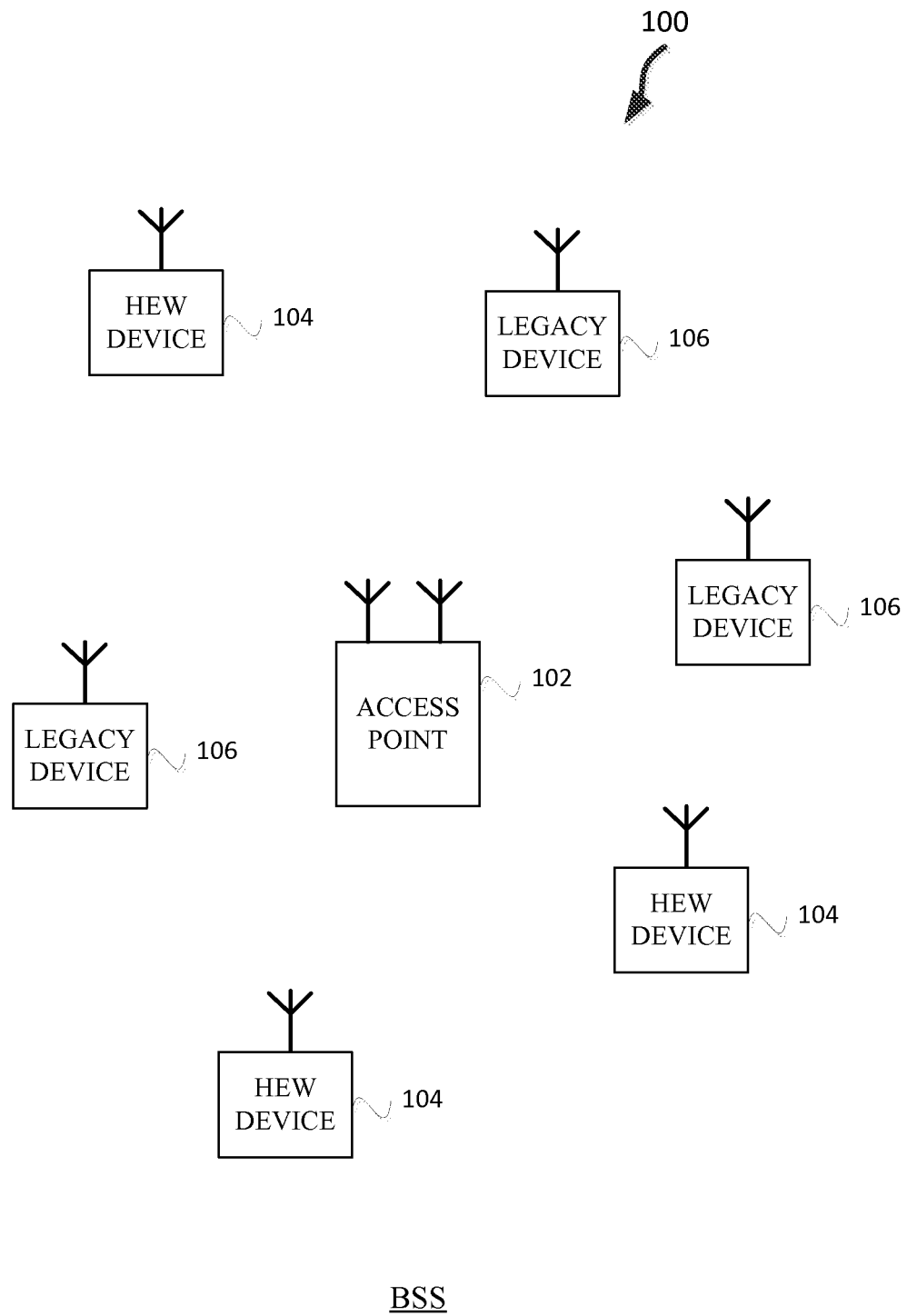
FIG. 1 illustrates a wireless network, in accordance with some embodiments.

FIG. 1 illustrates a wireless network in accordance with some embodiments. The wireless network may comprise a basic service set (BSS) 100 that may include an access point (AP) 102, a plurality of HEW devices 104 and a plurality of legacy devices 106.

The AP 102 may be an access point (AP) using the Institute of Electrical and Electronics Engineers (IEEE) 802.11 to transmit and receive. In example embodiments, the AP 102 may be a base station. The AP 102 may use other communications protocols as well as the 802.11 protocol. For example, the AP 102 may use 802.16 or 802.15.1. The 802.11 protocol may be 802.11ax. The 802.11 protocol may include using Orthogonal Frequency-Division Multiple Access (OFDMA) and/or Space-Division Multiple Access (SDMA). The 802.11 may include using multi-user multiple-input and multiple-output (MU-MIMO). The HEW devices 104 may operate in accordance with 802.11ax. The legacy devices 106 may operate in accordance with one or more of 802.11 a/g/ag/n/ac, or another legacy wireless communication standard. In example embodiments, the BSS 100 may include more than one AP 102. In example embodiments, the AP 102 and/or the HEW device 104 may be referred to as a master device when the AP 102 and/or HEW device 104 is performing a multi-user operation such as multi-user uplink or downlink operations.

The HEW devices 104 may be wireless transmit and receive devices such as a cellular telephone, handheld wireless device, wireless glasses, wireless watch, wireless personal device, tablet, or another device that may be transmitting and receiving using the 802.11 protocol such as 802.11 ax or another wireless protocol.

The BSS 100 may operate on a primary channel and one or more secondary channels or sub-channels. The BSS 100 may include one or more APs 102. In accordance with embodiments, the AP 102 may communicate with one or more of the HEW devices 104 on one or more of the secondary channels or sub-channels or the primary channel. In example embodiments, the AP 102 communicates with the legacy devices 106 on the primary channel. In example embodiments, the AP 102 may be configured to communicate concurrently with one or more of the HEW devices 104 on one or more of the secondary channels and a legacy device 106 utilizing only the primary channel and not utilizing any of the secondary channels.

The AP 102 may communicate with legacy devices 106 in accordance with legacy IEEE 802.11 communication techniques. In example embodiments, the AP 102 may also be configured to communicate with HEW devices 104 in accordance with legacy IEEE 802.11 communication techniques. Legacy IEEE 802.11 communication techniques may refer to any IEEE 802.11 communication technique prior to IEEE 802.11ax.

In some embodiments, HEW frames may be configurable to have the same bandwidth or different bandwidths, and the bandwidth may be one of 20 MHz, 40 MHz, or 80 MHz contiguous bandwidths or an 80+80 MHz (160 MHz) non-contiguous bandwidth, or another bandwidth. In some embodiments, a 320 MHz contiguous bandwidth may be used. In some embodiments, bandwidths of 1 MHz, 1.25 MHz, 2.5 MHz, 5 MHz, 10 MHz, or another bandwidth, or a combination thereof may also be used. In example embodiments, the bandwidths may be any bandwidth that is smaller than the bandwidth that is being used for the wireless medium. For example, the bandwidth may be between 1 MHz and 320 MHz. In these embodiments, a HEW frame may be configured for transmitting a number of spatial streams.

In other embodiments, the AP 102, HEW device 104, and/or legacy device 106 may implement one or more of different technologies such as code-division multiple-access (CDMA) 2000, CDMA2000 1x, CDMA2000 evolution data-optimized (EV-DO), Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), Long-Term Evolution (LTE), 802.15.1, and IEEE 802.16 (i.e., Worldwide Interoperability for Microwave Access (WiMAX)).

In an OFDMA system such as 802.1 lax, an associated HEW device 104 may operate on different 20 MHz subchannel of the BSS 100. For example, the BSS 100 may operate on a 80 MHz bandwidth with four subchannels of 20 MHz each.

In example embodiments, an AP 102, HEW devices 104, and legacy devices 106 use carrier sense multiple access/ collision avoidance (CSMA/CA). In some embodiments, the media access control (MAC) layer 1706 (see FIG. 17) controls access to the wireless media.

In example embodiments, an AP 102, HEW devices 104, and legacy devices 106 perform carrier sensing and can detect whether or not the channel is free. For example, an AP 102, HEW device 104, or legacy device 106 may use clear channel assessment (CCA) which may include a determination whether or not the channel is clear based on a Decibel-milliwatts (dBm) level of reception. In example embodiments, the physical layer (PHY) 1704 is configured to determine a CCA for an AP 102, HEW devices 104, and legacy devices 106.

In example embodiments, an AP 102, HEW devices 104, legacy devices 106, access the channel in different ways. For example, in accordance with some IEEE 802.1 lax (High-Efficiency wireless or Wi-Fi (HEW)) embodiments, an AP 102 may operate as a master station which may be arranged to contend for a wireless medium (e.g., during a contention period) to receive exclusive control of the medium for an HEW control period (i.e., a transmission opportunity (TXOP)). The AP 102 may transmit an HEW master-sync transmission at the beginning of the HEW control period. During the HEW control period, HEW devices 104 may communicate with the AP 102 in accordance with a non-contention based multiple access technique. This is unlike conventional 802.11 communications in which legacy devices 106 and, optionally, HEW devices 104 communicate in accordance with a contention-based communication technique, rather than a multiple access technique. During the HEW control period, the AP 102 may communicate with HEW devices 104 using one or more HEW frames. During the HEW control period, legacy devices 106 refrain from communicating. In some embodiments, the master-sync transmission may be referred to as an HEW control and schedule transmission.

In some embodiments, the multiple-access technique used during the HEW control period may be a scheduled OFDMA technique, although this is not a necessary. In some embodiments, the multiple access technique may be a time-division multiple access (TDMA) technique or a frequency division multiple access (FDMA) technique. In some embodiments, the multiple access technique may be a space-division multiple access (SDMA) technique.

The AP 102 may also communicate with legacy devices 106 in accordance with legacy IEEE 802.11 communication techniques. In some embodiments, the master station may also be configured to communicate with HEW stations outside the HEW control period in accordance with legacy IEEE 802.11 communication techniques, although this is not a requirement.

In example embodiments, the HEW device 104 and/or AP 102 are configured to perform one or more of the functions and/or methods described herein in conjunction with FIGS. 1-17 for performing downlink OFDMA and/or MU-MIMO with a RTS/CTS portion and/or for performing an uplink OFDMA and/or MU-MIMO where the uplink portion includes a duration for devices not participating in the uplink OFDMA and/or MU-MIMO to defer for the duration.

Figure 2:
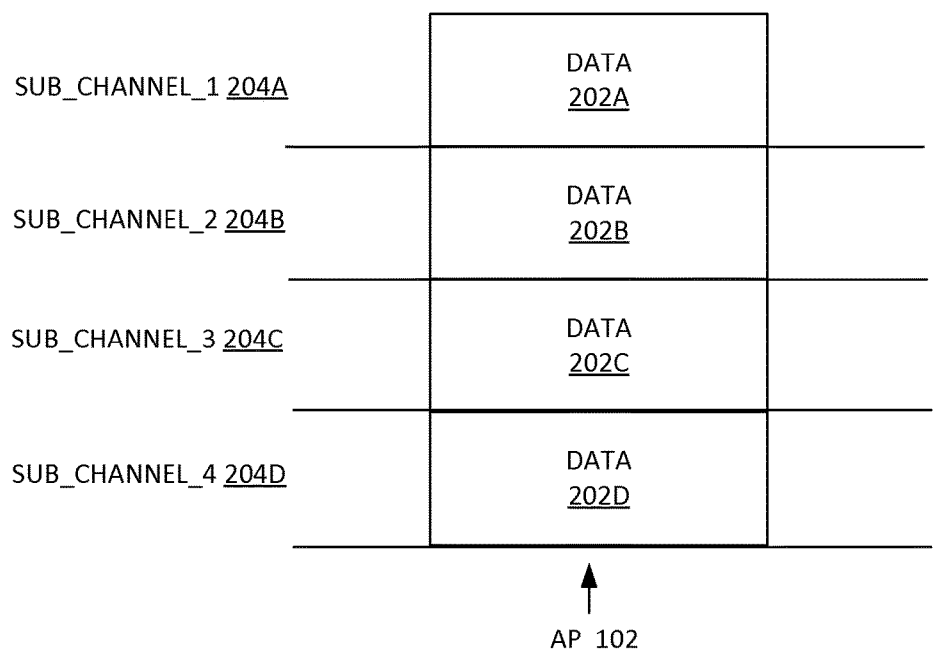
FIG. 2 illustrates an OFDMA downlink transmission during a transmission opportunity (TXOP), according to example embodiments.

FIG. 2 illustrates an OFDMA downlink transmission during a TXOP according to example embodiments. Illustrated along the horizontal axis is time with the AP 102 transmitting data 202A, data 202B, data 202C, and data 202D. Illustrated along the vertical axis is frequency with four subchannels: sub_channel_1 204A, sub_channel_2 204B, sub_channel_3 204C, and sub_channel_4 204D. The AP 102 may transmit data 202A for a first HEW device 104 on sub_channel_1 204A. The AP 102 may transmit data 202B for a second HEW device 104 on sub_channel_2 204B. The AP 102 may transmit data 202C for a third HEW device 104 on sub_channel_3 204C. The AP 102 may transmit data 202D for a third HEW device 104 on sub_channel_4 204D.

Figure 3:
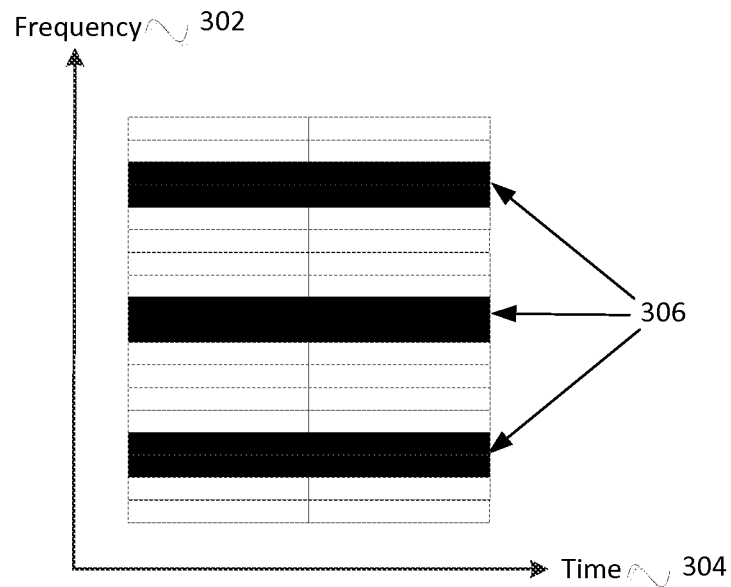
FIG. 3 illustrates distributed subchannels for OFDMA downlink or uplink transmission, according to example embodiments.

FIG. 3 illustrates distributed subchannels for OFDMA downlink or uplink transmission, according to example embodiments. Illustrated in FIG. 3 is frequency 302 along a vertical axis and time 304 along a horizontal axis. The distributed subchannel 306 includes frequencies that are not continuous. In example embodiments, HEW devices 104 and/or the AP 102 may transmit and receive distributed subchannels 306 during OFDMA downlink and uplink transmissions.

Figure 4:
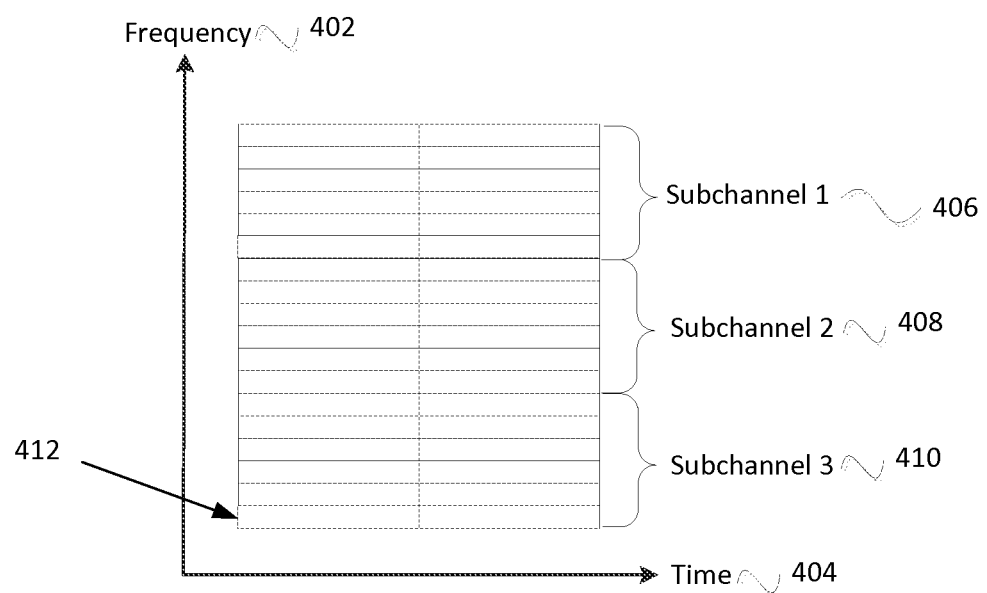
FIG. 4 illustrates localized or continuous subchannels, according to example embodiments.

FIG. 4 illustrates localized or continuous subchannels 406, 408, and 410, according to example embodiments. Illustrated in FIG. 4 is frequency 402 along the vertical axis and time 404 along the horizontal axis. Three subchannels are illustrated: subchannel 1 406, subchannel 2 408, and subchannel 3 410, all of which are localized or continuous frequencies 402. The subchannels 406, 408, 410 may be composed of a multiple of a minimum frequency allocation 412, e.g. the minimum frequency allocation 412 may be 2 MHz or some other appropriate frequency bandwidth. In example embodiments, HEW devices 104 and/or the AP 102 may transmit and receive localized or continuous subchannels 406, 408, and 410 during OFDMA downlink and uplink transmissions.

Figure 5:
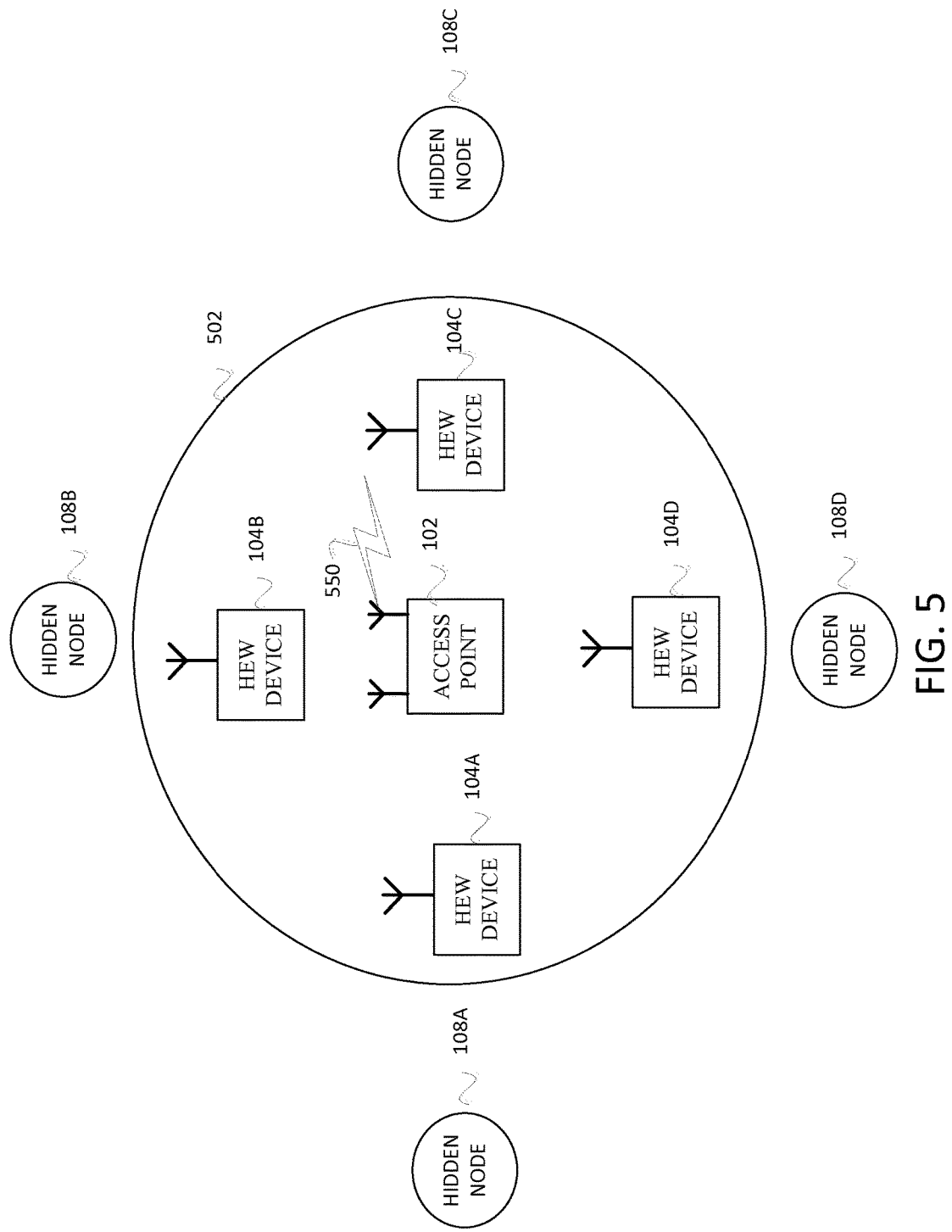
FIG. 5 illustrates the hidden node problem for downlink transmissions, according to example embodiments.

FIG. 5 illustrates the hidden node problem for downlink transmissions according to example embodiments. Illustrated in FIG. 5 are the transmission range 502 of the AP 102 and transmission 550. The AP 102 may be sending transmission 550 to HEW device 104C. The AP 102 transmission range 502 does not include hidden node 108C. Hidden node 108C will then not receive transmission 550 and will not defer transmitting. Hidden node 108C may then transmit at the same time that AP 102 is transmitting, which may interfere with the reception of the transmission 550 to HEW device 104C. Similarly, the AP 102 may be simultaneously transmitting using MU-MIMO or OFDMA to one or more of HEW device 104A, HEW device 104B, and HEW device 104D.

In example embodiments, the AP 102 and HEW devices 104 may be configured to use request-to-send and clear-to-send in an OFDMA or MU-MIMO downlink transmission so that the hidden nodes 108 will defer transmitting during the OFDMA and/or MU-MIMO downlink transmission. In example embodiments, the AP 102 and/or HEW devices 104 may set a PHY length field or a MAC length field to defer the hidden nodes 108 as described herein.

Figure 6:
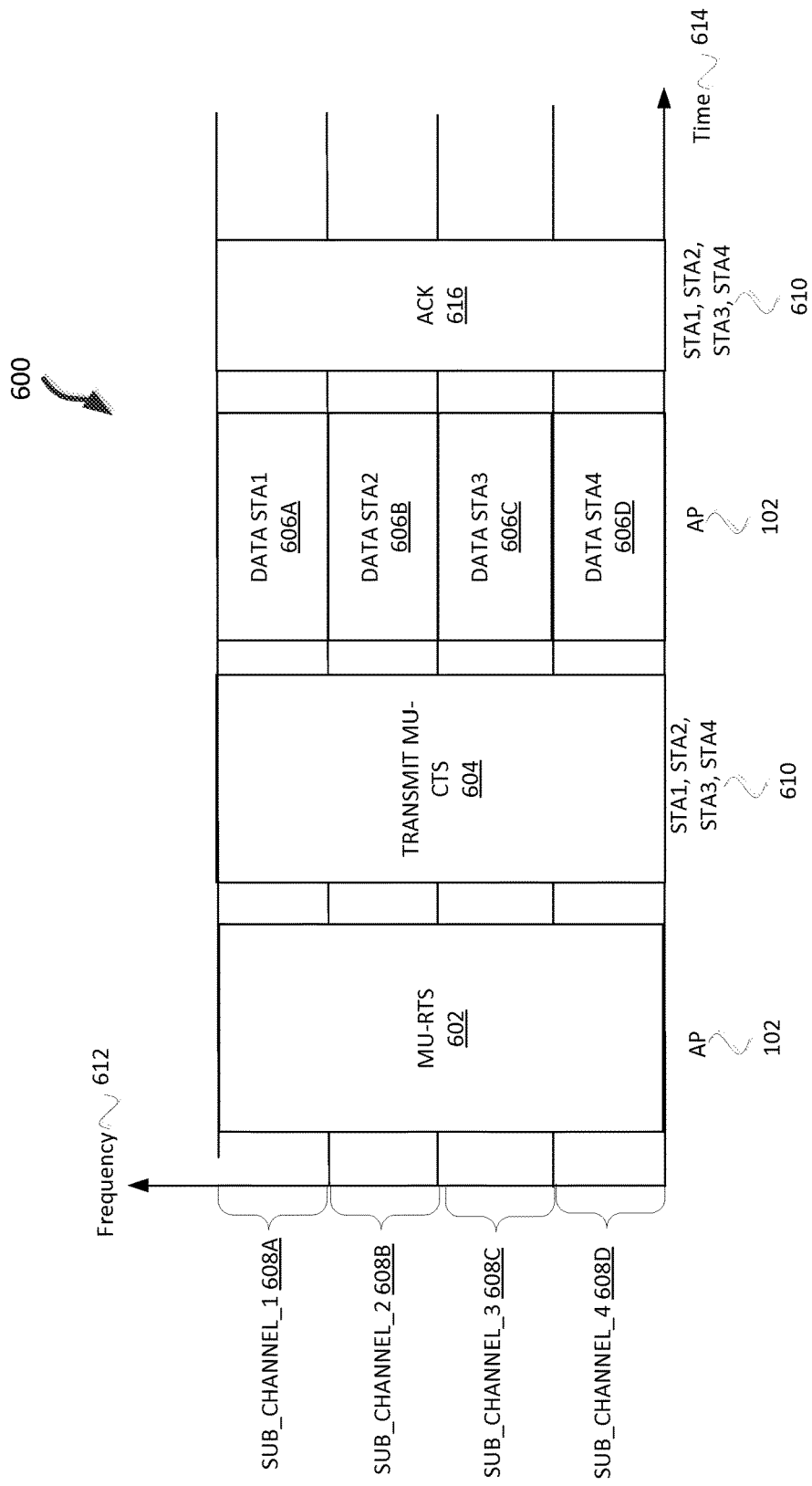
FIG. 6 illustrates a method of MU RTS/CTS downlink OFDMA and/or MU-MIMO, according to example embodiments.

FIG. 6 illustrates a method 600 of MU RTS/CTS downlink OFDMA and/or MU-MIMO, according to example embodiments. Illustrated in FIG. 6 is frequency 612 along the vertical axis and time 614 along the horizontal axis. The frequency 612 is divided into four subchannels 608A, 608B, 608C, and 608D. The subchannels 608A, 608B, 608C, and 608D may be localized/continuous or distributed subchannels 306. The STA1, STA2, STA3, and STA4 may be HEW devices 104. In example embodiments, the number of subchannels 608 and size of the subchannels 608 may be different. The method 600 begins at operation 602 with the AP 102 transmitting MU-RTS to STA1, STA2, STA3, and STA4 610. For example, the AP 102 may transmit a RTS to each of STA1, STA2, STA3, and STA4 on their respective subchannels 608. In some embodiments, the AP 102 may transmit a MU-RTS on a common subchannel 608, such as a primary subchannel, that may be used by legacy devices 106 as well. In some embodiments, the AP 102 may transmit the MU-RTS on the subchannels 608 or a different subchannel which may be a different size or bandwidth than the subchannels 608. The MU-RTS 602 may include a deferral duration for HEW devices 104, legacy devices 106, and/or APs 102 that are not part of the MU RTS/CTS downlink OFDMA and/or MU-MIMO. In example embodiments, the deferral duration may include multiple downlink data transmissions. The MU-RTS 602 may include a resource map as described herein. The MU-RTS 602 may be an MU-RTS 700, 800 as described in conjunction with FIGS. 7 and 8.

The method 600 continues at operation 604 with STA1, STA2, STA3, and STA4 610 transmitting MU-CTSs to the AP 102. For example, STA1, STA2, STA3, and STA4 610 may transmit the MU-CTS simultaneously on their respective subchannels. The MU-CTS may notify hidden nodes 108 to defer transmitting. In example embodiments, the MU-CTS may indicate a time to defer that includes operation 606 and operation 616.

The method 600 may continue at operation 606 with the AP 102 transmitting data 606A, 606B, 606C, and 606D to STA1, STA2, STA3, and STA4, respectively. For example, the AP 102 may transmit a downlink resource map as part of the MU-RTS to the STAs and then transmit data 606 according to the downlink resource map. The method 600 may continue with the STAs sending ACKs to the AP 102 in response to the DATA 606. For example, each STA 610 may transmit an ACK using a subchannel that was part of the resource map allocated to the STA 610. In example embodiments, the ACKs may be block ACKs (BAs).

Figure 7:
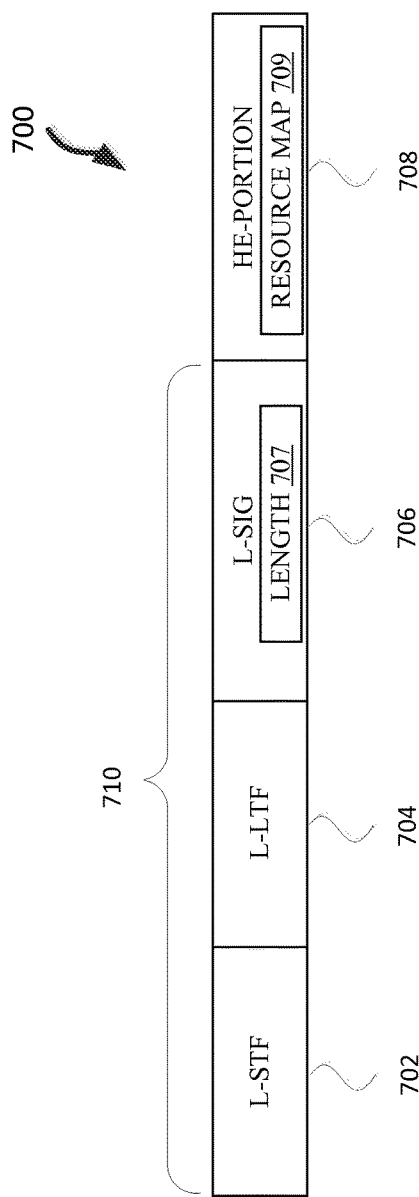
FIG. 7 illustrates an example of a MU-RTS with a length field used to defer STAs not participating in downlink OFDMA and/or MU-MIMO, according to example embodiments.
Figure 8:
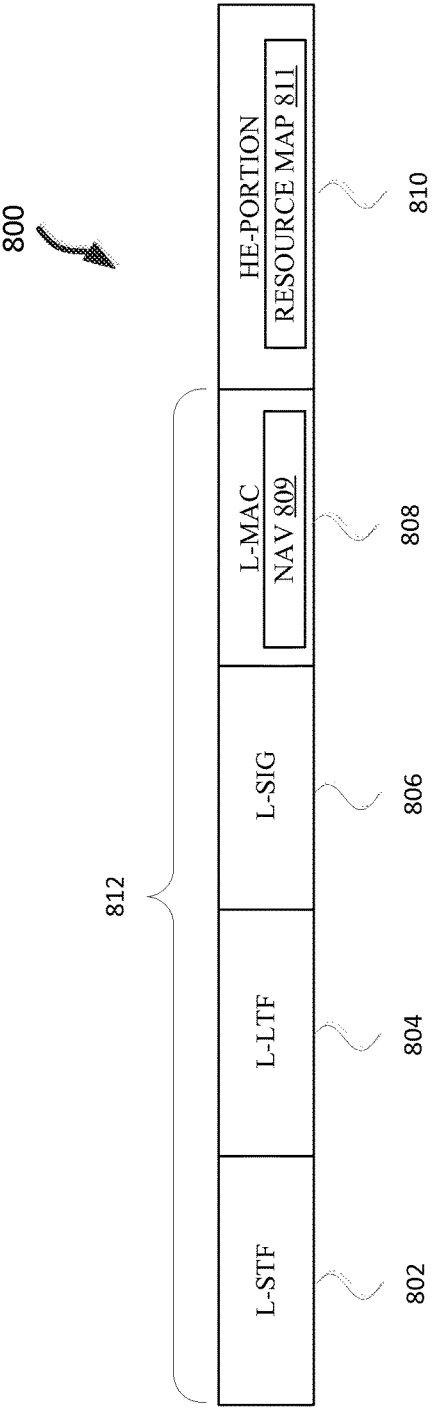
FIG. 8 illustrates an example of a MU-RTS with legacy MAC frame with a NAV field used to defer STAs not participating in the downlink OFDMA and/or MU-MIMO, according to example embodiments.

FIG. 7 illustrates an example of a MU-RTS 700 with a length field used to defer STAs not participating in downlink OFDMA and/or MU-MIMO according to example embodiments. FIG. 8 illustrates an example of a MU-RTS 800 with legacy MAC frame with a NAV field used to defer STAs not participating in the downlink OFDMA and/or MU-MIMO according to example embodiments. FIGS. 7 and 8 will be described in conjunction with one another. FIGS. 7 and 8 illustrate example MU-RTS 700, 800, respectively, that may be transmitted by the initiator of the downlink OFDMA and/or MU-MIMO. The initiator may be the AP 102.

FIG. 7 illustrates a legacy portion 710 and a HE-portion 708 The legacy portion 710 may include a legacy short-training field (L-STF) 702, a legacy long-training field (L-LTF) 704, and legacy signal field (L-SIG) 706. The L-SIG 706 may include a length 707 field. The length 707 field may be set for a duration that indicates a length 707 so that HEW devices 104 and legacy devices 106 not participating in the downlink OFDMA and/or MU-MIMO may defer transmitting until after the end of the transmit downlink OFDMA. For example, the length 707 field may be part of the MU-RTS 602 (FIG. 6) and may indicate a duration after the ACK 616 is completed. In example embodiments, the use of the length 707 field to defer devices until the end of the downlink OFDMA and/or MU-MIMO may be termed physical layer spoofing which may provide long protection duration that saves power decoding. For example, HEW devices 104 such as HEW device 104D (FIG. 5) that may not be participating in the downlink OFDMA and/or MU-MIMO may defer for the duration indicated in the length 707.

FIG. 8 illustrates a legacy portion 812 and a HE-portion 810. The legacy portion 812 may include a legacy short-training field (L-STF) 802, a legacy long-training field (L-LTF) 804, legacy signal field (L-SIG) 806, and a legacy media access control (L-MAC) 808 frame, which may be appended to the L-SIG 806. The NAV 809 field may be set for a duration that indicates a length 707 so that HEW devices 104 and legacy devices 106 not participating in the downlink OFDMA and/or MU-MIMO may defer transmitting until after the end of the transmit downlink OFDMA. For example, the NAV 809 field may be part of the MU-RTS 602 (FIG. 6) and may indicate a duration after the ACK 616 is completed. For example, HEW devices 104 such as HEW device 104D (FIG. 5) that may not be participating in the downlink OFDMA and/or MU-MIMO may defer for the duration indicated in the NAV 809.

The legacy portion 710, 812 of the MU-RTS 700, 800, respectively, may be sent over a 20 MHz sub-channel which may be a primary sub-channel that legacy devices 106 tune to. In example embodiments, the legacy portion 710, 812 may be transmitted on one or more 20 MHz sub-channels. In example embodiments, the MU-RTS 700, 800 may be transmitted on one or more sub-channels, which may be 20 MHz. In example embodiments, the MU-RTS 700, 800 or HE-portion 708, 810 may be transmitted on one or more sub-channels, which may be 20 MHz.

The MU-RTS 700, 800 may include an indication of an address for each HEW device 104 that is intended for the MU-RTS 700, 800. The MU-RTS 700, 800 may include a resource map 811 for sub-channel allocation for the HEW device 104. The downlink resource map 811 may include a resource allocation for a HEW device 104 in accordance with OFDMA and/or MU-MIMO. The downlink resource map 709, 811 may include a sub-channel indication for the HEW device 104 to transmit MU-CTS and may include a duration. The indication of an address of the HEW device 104 may be an association identification (AID) generated when the HEW device 104 associated with the AP 102, an address of the HEW device 104, or another identification that the AP 102 may use to identify the HEW device 104, such as a group membership identification or other identification that the AP 102 may use and the HEW device 104 may determine, references the HEW device 104.

The MU-RTS 700, 800 may be, for example, a new control frame, a management frame, or an IEEE 802.11ax trigger frame. The MU-RTS 700, 800 may be a multi-cast frame destined for multiple HEW devices 104, which are the destined HEW devices 104 of a MU-transmission from the AP 102.

The MU-RTS 700, 800 may indicate one or more tones for a HEW device 104 to use to indicate that they would like to participate in the downlink OFDMA and/or MU-MIMO. For example, the MU-RTS 700, 800 may include tone map 1303 as described in conjunction with FIG. 13. In example embodiments, the MU-RTS 700, 800 may indicate a module and coding scheme (MCS) for HEW devices 104 to use to respond to the MU-RTS 700, 800.

Figure 9:
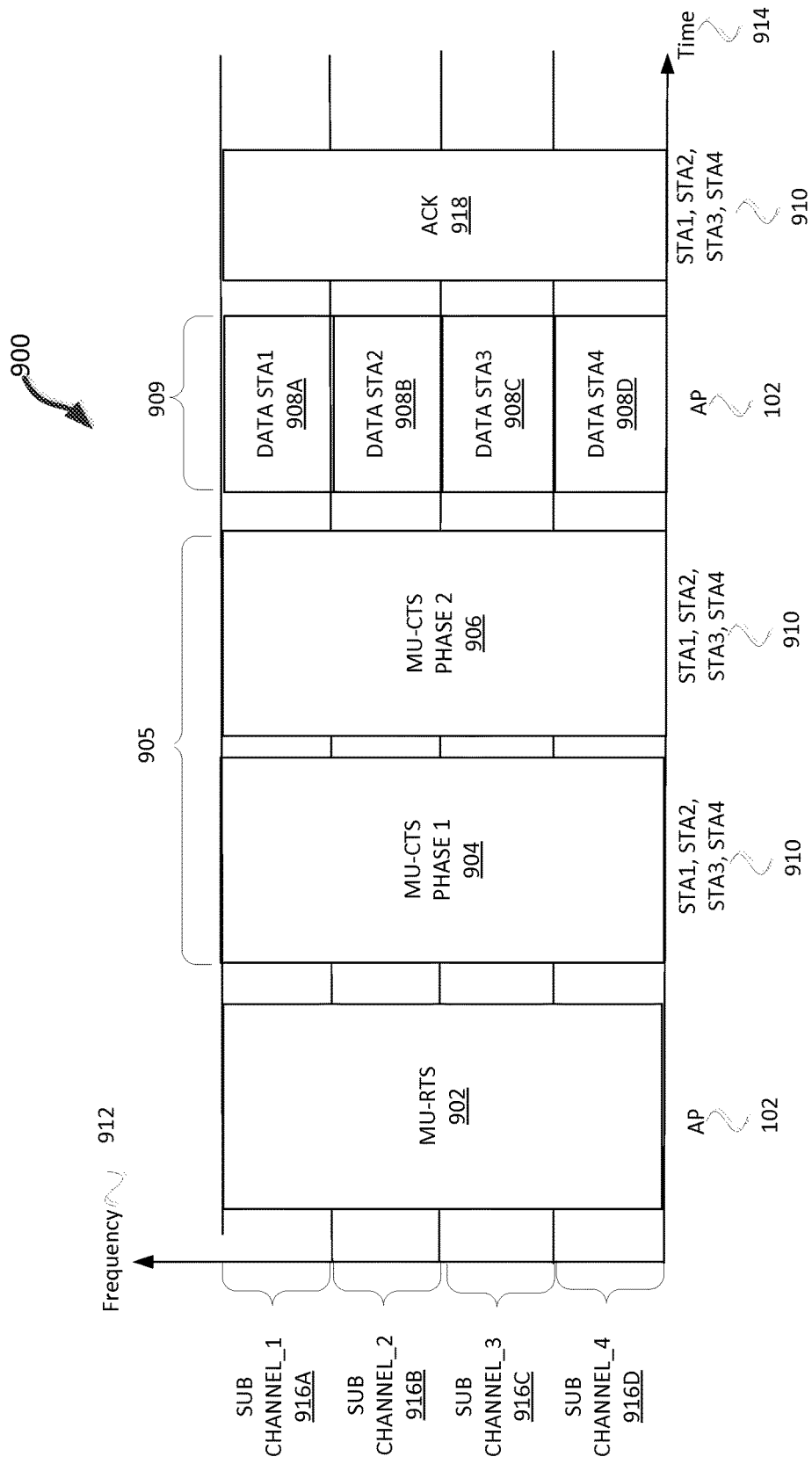
FIG. 9 illustrates a method of MU RTS/CTS downlink OFDMA and/or MU-MIMO with two phases for MU-CTS, according to example embodiments.

FIG. 9 illustrates a method 900 of MU RTS/CTS downlink OFDMA and/or MU-MIMO with two phases for MU-CTS, according to example embodiments. Illustrated in FIG. 9 is frequency 912 along the vertical axis and time along the horizontal axis 914. The frequency 912 may be divided into four sub-channels sub-channel_1 916A, sub-channel_1 916B, sub-channel_1 916C, and sub-channel_1 916D. The frequency 912 may be divided into a different number of sub-channels 916 that may be a different size than illustrated.

The method 900 may begin at operation 902 with a MU-RTS being transmitted by an AP 102. The MU-RTS operation 902 may be in accordance with MU-RTS 700, 800. The MU-RTS may include an indication of which STAs are to be included in the downlink OFDMA and/or MU-MIMO. In some embodiments, the MU-RTS operation 902 may be a broadcast packet. The method 900 continues at 905 with a two phase MU-CTS. MU-CTS phase-1 operation 904 may include STAs that are indicated in the MU-RTS to be included in the downlink OFDMA and/or MU-MIMO. The STA1, STA2, STA3, and STA4 (collectively STAs 910) may transmit a MU-CTS in operation 904. The STAs 910 may be indicated in the MU-RTS operation 902 to participate in the downlink OFDMA and/or MU-MIMO.

For example, a STA 610 indicated in the MU-RTS operation 902 may transmit a MU-CTS. In example embodiments, the STAs 910 may transmit a MU-CTS that will defer a hidden node. For example, HEW device 104A may be included in the MU-RTS and may transmit a MU-CTS that is received by the hidden node 108A. The HEW device 104A may determine a duration in the MU-CTS based on the MU-RTS transmitted in operation 902. In example embodiments, a STA 610 may be indicated in the MU-RTS, but may have its NAV 809 set and not transmit a MU-CTS. In example embodiments, the MU-CTS may be a legacy CTS frame. The CTS frame may have the same scrambling seed for synchronization. For example, the scrambling seed may be pre-defined, signaled by the MU-RTS, or be copied from the MU-RTS. In example embodiments, the MU-CTS may be other types of frames that indicate a deferral duration based on the MU-RTS. In example embodiments, the deferral duration may include multiple downlink data transmissions. In example embodiments, the STAs 910 may transmit using the same MCS so that the duration of the MU-CTS operation 904 will be the same. In example embodiments, the MU-RTS may indicate the MCS for the STAs 910 to use. In example embodiments, the MU-CTS may use the NAV 809 field in an L-MAC 808 or a length 707 field in a L-SIG to indicate a duration for other devices to defer. The STAs 910 may be configured to determine the duration for other devices to defer based on the received MU-RTS.

In example embodiments, the STAs 910 may transmit the MU-CTS on a primary 20 MHz sub-channel 916, which may be a channel that legacy devices 106 tune to. In example embodiments, the STAs 910 may transmit only in the 20 MHz subchannel so that the STA 910 will receive the downlink data. For example, the resource map 709, 811 may indicate a subchannel for the STA 910 to receive downlink data. The STA 910 may transmit the MU-CTS in the subchannel indicated in the resource map 709, 811. In example embodiments, the STA 910 may transmit in each 20 MHz subchannel that carrier sensing or NAV check indicates is not busy. In example embodiments, the AP 102 may send another MU-RTS after MU-CTS phase I operation 904 and before MU-CTS phase 2 906.

The method 900 may continue at operation 906 with MU-CTS phase-2. For example, the STAs 910 may transmit on specific sub-channels 916 to indicate that the STA 910 responds. The resource map 709, 811 may indicate a sub-channel allocation for the STA 910, and the STA 910 may transmit a MU-CTS phase-2 that indicates the STA 910 is going to participate in the downlink OFDMA and/or MU-MIMO. The MU-RTS operation 902 may include a tone map 1303 (FIG. 13), which may indicate a tone the STAs 910 should respond on. The STAs 910 may transmit right after MU-CTS phase-1 without a time separation. In example embodiments, after MU-CTS phase-1 the STAs 910 may transmit after a duration such as short interframe space (SIFS). The AP 102 may indicate the MCS to use in MU-RTS. In example embodiments, operation 906 may be skipped if a STA 910 transmitted in MU-CTS phase-1. In example embodiments, MU-CTS phase I operation 904 and MU-CTS phase 2 operation 906 may be in a different order. For example, MU-CTS phase 2 906 may be first and MU-CTS phase I operation 904 may be second.

Figure 10:
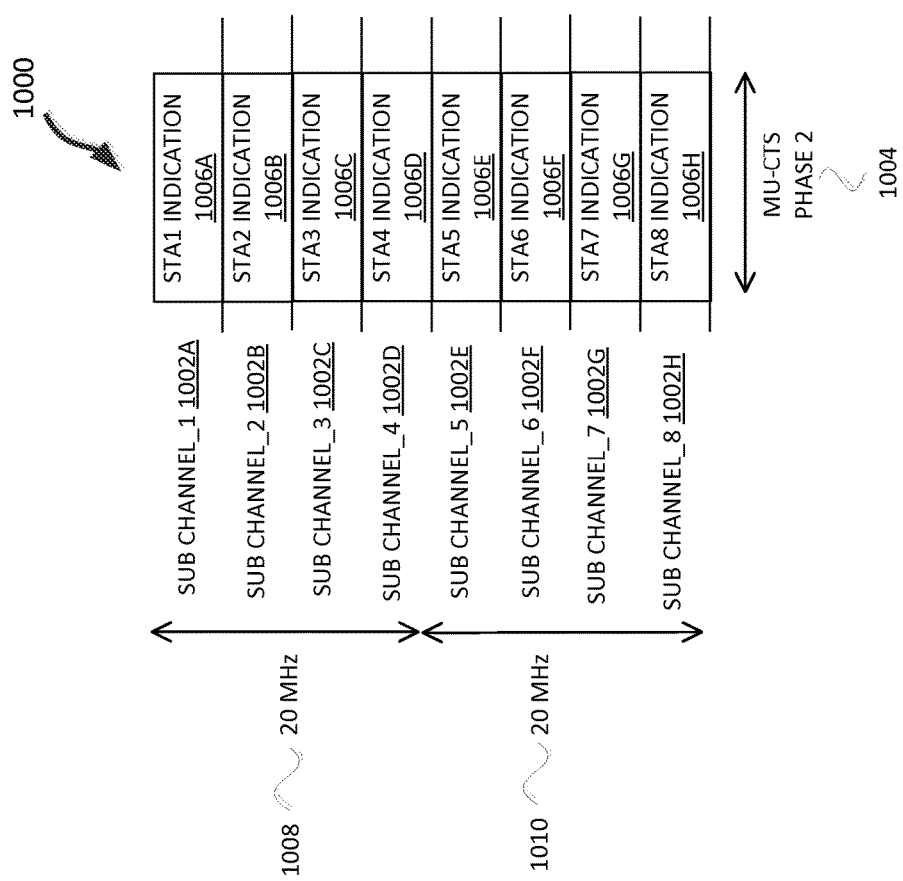
FIG. 10 illustrates a MU-CTS phase-2, according to example embodiments.
Figure 11:
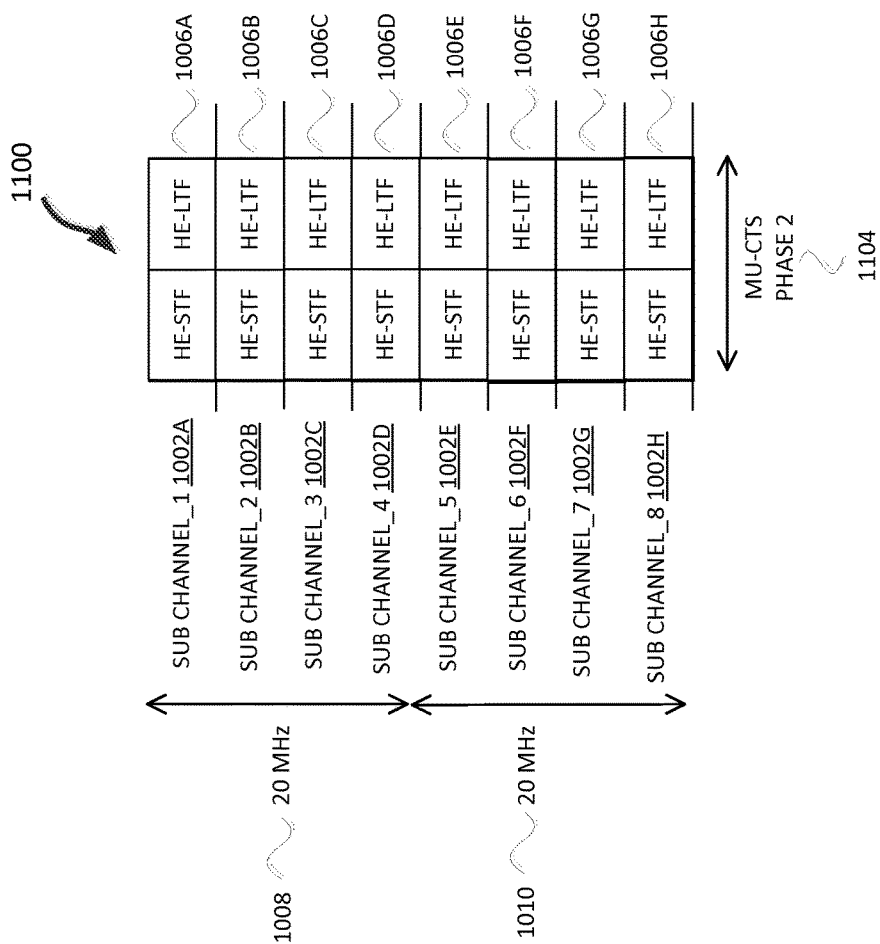
FIG. 11 illustrates a MU-CTS phase-2 where the STA indication is a HE-STF and HE-LTF.
Figure 12:
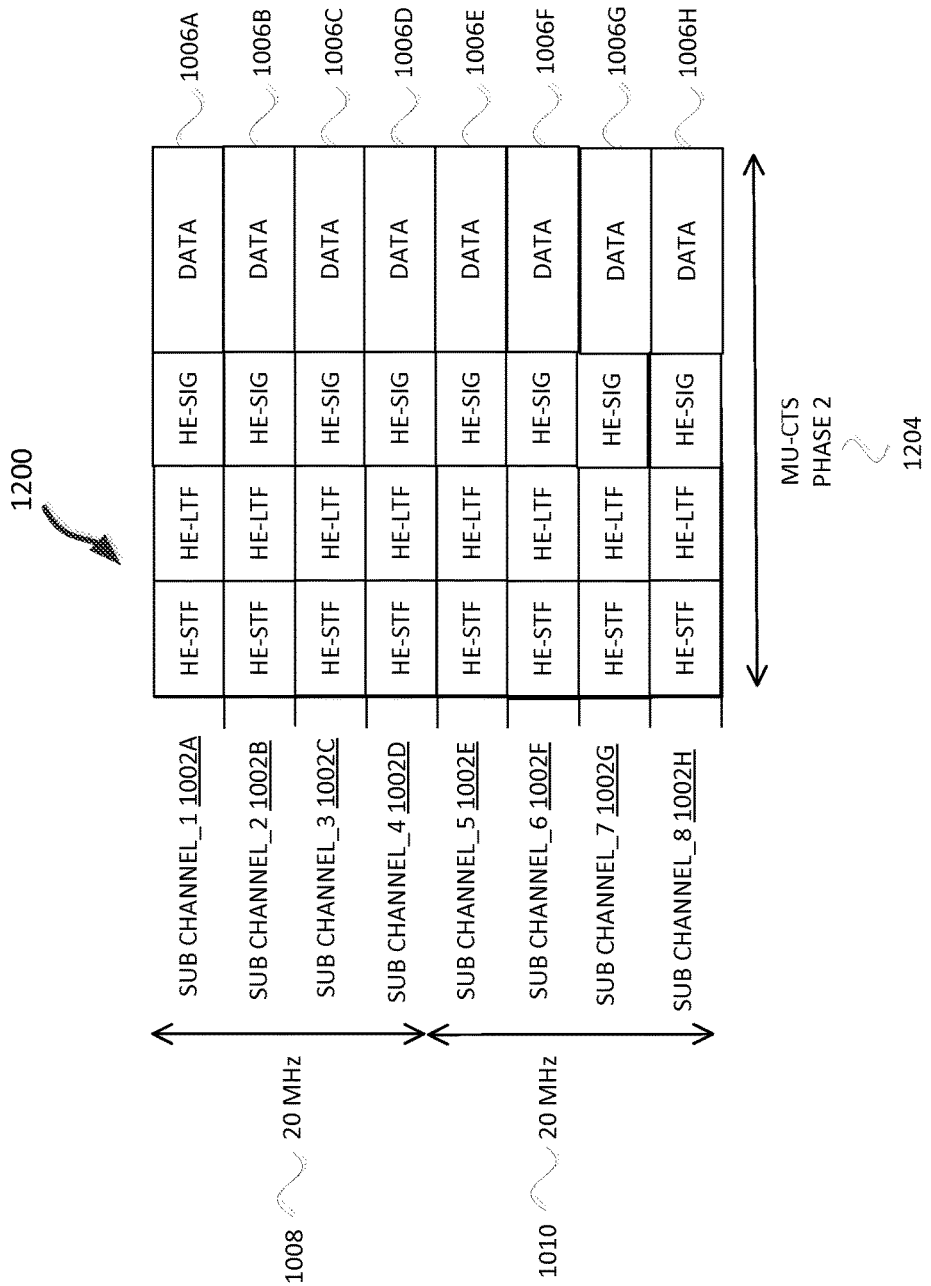
FIG. 12 illustrates a MU-CTS phase-2 where the STA indication is a HE-STF, HE-LTF, HE-SIG, and data.

FIGS. 10, 11, and 12 illustrate example embodiments of MU-CTS phase-2 906. FIG. 10 illustrates a MU-CTS phase-2 1000 according to example embodiments. Illustrated along the vertical axis is frequency with two 20 MHz sub-channels 1008, 1010, and time along the horizontal axis, which indicates a duration of MU-CTS phase-2 1004. STA1 subchannel 1002A through STA8 subchannel 1002H may be used to transmit a STA1 indication 1006A through STA9 indication 1006H, respectively, in a sub-channel 1002. OFDMA may be used to transmit the STA indication 1006.

Figure 13:
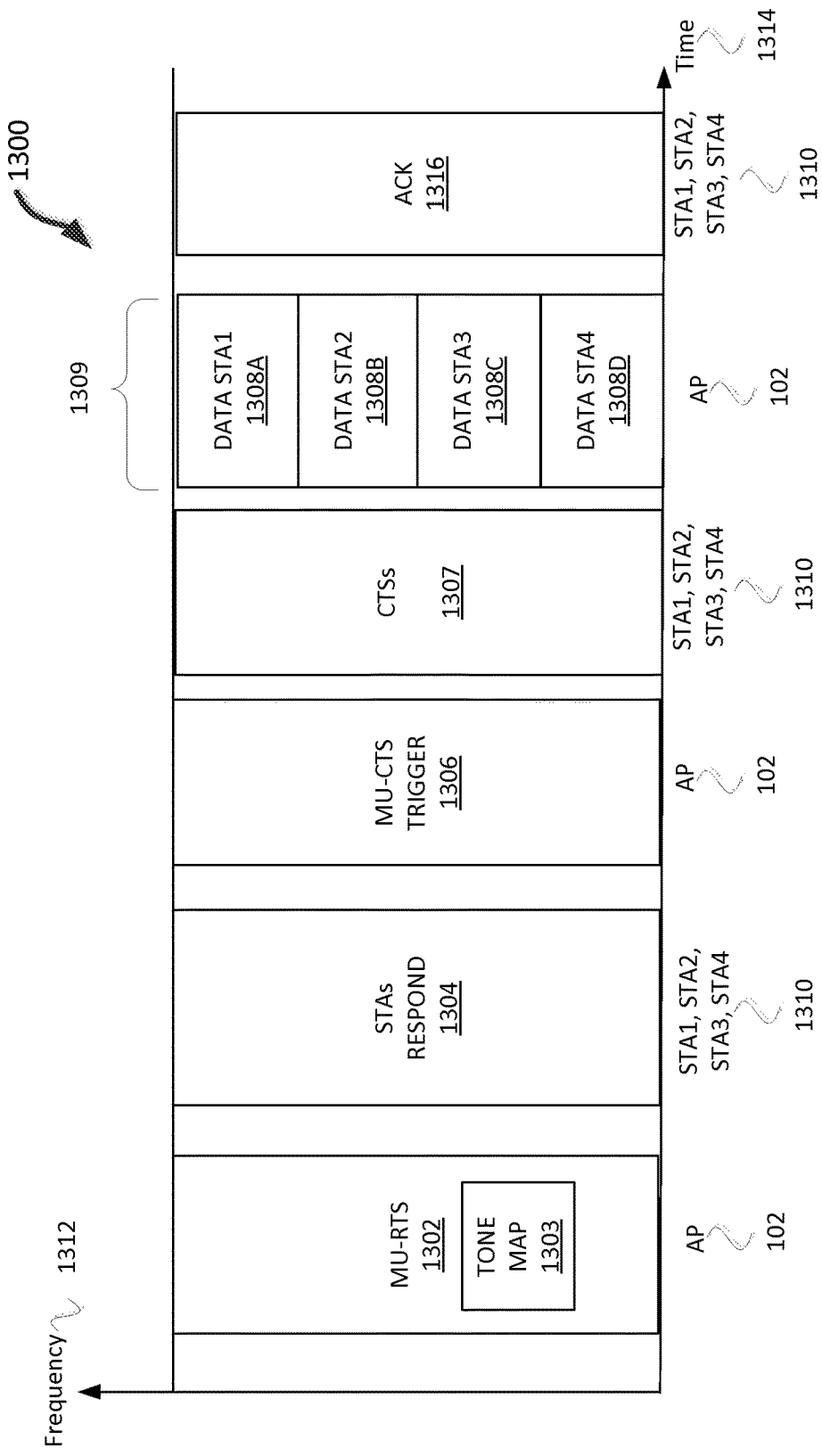
FIG. 13 illustrates a method of MU RTS/CTS downlink OFDMA and/or MU-MIMO, according to example embodiments.

FIG. 11 illustrates a MU-CTS phase-2 1100 where the STA indication 1006 is a HE-STF and HE-LTF. The MU-CTS phase-2 1104 may be comprised of a HE-STF followed by a HE-LTF that each STA subchannel 1002 transmits on that is indicated by the resource map 709, 811 and/or a tone map 1303 (FIG. 13). FIG. 12 illustrates a MU-CTS phase-2 1200 where the STA indication 1006 is a HE-STF, HE-LTF, HE-SIG, and data 606. The MU-CTS phase-2 1204 may be comprised of a HE-STF, HE-LTF, HE-SIG, and data 606 that each STA subchannel 1002 transmits on that is indicated by the resource map 709, 811. The data 606 may include a MCS for a downlink physical layer convergence procedure (PLCP) protocol data unit (PPDU) during the downlink OFDMA and/or MU-MIMO operation 909. In example embodiments, the data 606 may include a buffer status report for an uplink multi-user transmission. In example embodiments, the HE-SIG may be transmitted per sub-channel 1002 or on the whole operating bandwidth. Each STA may transmit on a sub-channel 1002 that is indicated by the resource map 709, 811 and/or a tone map 1303 (FIG. 13). Other example of the indication 1006 include a HE-STF only; a HE-STF, HE-LTF, and HE-SIG; a HE-SIG, HE-STF, and HE-LTF; and, HE-SIG, HE-STF, HE-LF, and data 606. In example embodiments, the MU-CTS phase-2 906 may include a legacy preamble that includes a deferral such as a PHY layer length 707 or a MAC layer NAV 809. In example embodiments, the deferral duration may include multiple downlink data transmissions. In example embodiments, the MU-CTS phase-2 906 may include a MU-CTS response.

In example embodiments, the sub-channel indication 1006 is transmitted with OFDMA rather than MU-MIMO even if the downlink transmission will use MU-MIMO because MIMO transmission may have additional overhead. Moreover, the number of maximum MU-MIMO per 20 MHz may be limited to 8, which may be less than the number of maximum OFDMA users per 20 MHz.

The method 900 may continue at operation 909 with downlink data 908 transmitted by the AP 102 to STA1, STA2, STA3, and STA4 910. After the AP 102 receives MU-CTS phase-2 906, the AP 102 may determine which STA 910 responded to the MU-RTS operation 902. The AP 102 may leave sub-channels 1002 empty for STAs 910 that did not respond to the MU-RTS operation 902 and increase power to the transmissions in other sub-channels 1002. In example embodiments, the AP 102 may re-allocate the resources for STAs 910 that did not respond to the MU-RTS operation 902 to other STAs 910 that did respond to the MU-RTS operation 902. In example embodiments, the number of STAs 910 that the AP 102 can poll using MU-RTS operation 902 may be limited by the number of sub-channels 1002 in a 20 MHz bandwidth. In example embodiments, the number of STAs 910 in the downlink data operation 909 transmission may not equal the total number of sub-channels 1002 in the whole operating bandwidth of the AP 102. In example embodiments, downlink data 908 may include a resource map 709, 811 that may have been changed from a previous resource map 709, 811 that may have been sent in MU-RTS operation 902. In example embodiments, the downlink data 908 may include a resource map 709, 811 that may be part of a preamble.

The method 900 may continue at operation 918 with ACK or BA transmitted by the STAs 910 to the AP 102. In example embodiments, the STAs 910 may transmit an ACK or BA operation 918 on the same sub-channel 1002 that the STA 910 received the data 908.

FIG. 13 illustrates a method 1300 of MU RTS/CTS downlink OFDMA and/or MU-MIMO, according to example embodiments. Illustrated along the vertical axis is frequency 1312 and along the horizontal axis is time 1314. The method 1300 begins at operation 1302 with the AP 102 transmitting a MU-RTS. The MU-RTS may include a tone map 1303. The tone map 1303 may map tones to STAs 1310. The MU-RTS may be in accordance with MU-RTS 700, 800 as described in conjunction with FIGS. 7 and 8.

The method 1300 continues at operation 1304 with STAs respond. For example, the STAs 1310 in the tone map 1303 respond in accordance with the tone map 1303. The STAs 1310 may transmit a STF, LTF, and response indicating that the STA 1310 would like to participate in the downlink OFDMA and/or MU-MIMO. STAs 1310 may not respond to the tone map 1303 if they do not receive the tone map 1303 or are unable to decode the tone map 1303. In example embodiments, a STA 1310 may not respond to the tone map 1303 if the STA 1310 does not want to participate in the downlink OFDMA and/or MU-MIMO. In example embodiments, the MU-RTS includes a resource map 709, 811. The response of the STAs 1310 may include a deferral as in a physical layer length 707 or a MAC layer NAV 809 field. In example embodiments, the STAs 1310 may transmit a packet that includes a deferral duration in one sub-channel 1002 and respond to the AP 102 on an assigned tone. In example embodiments, the STAs 1310 may transmit a CTS as part of operation 1304. In example embodiments, the deferral duration may include multiple downlink data 908 transmissions.

The method 1300 continues at operation 1306 with MU-CTS trigger being transmitted by the AP 102 to STAs 1310 selected by the AP 102. For example, the AP 102 may select STAs 1310 that responded to the tone map 1303. The MU-CTS trigger may include a resource map 709, 811. The MU-CTS trigger operation 1306 is an indication to the STAs 1310 to transmit a CTS.

The method 1300 continues at operation 1307 with the STAs 1310 transmitting a CTS. The CTS may be a legacy CTS, a deferral duration such as a PHY layer length 707 or MAC NAV 809 as described in conjunction with FIGS. 6-12. The STAs 1310 indicated in the CTS trigger of operation 1307 may transmit, prior to the start of operation 1309, a CTS to defer hidden nodes. The deferral duration may include a duration that includes operation 1316. In example embodiments, the deferral duration may include a duration that includes multiple downlink data 908 being transmitted by the AP 102 such as operation 1309.

The method 1300 continues at operation 1309 with downlink data 908 being transmitted from the AP 102 to the STAs 1310. Operation 1309 may be delayed to give the STAs 1310 enough time to transmit the CTS. Operation 1309 may include a preamble with a resource map 709, 811. Operation 1309 may include a deferral duration such as PHY layer length 707 or MAC layer NAV 809. In example embodiments, the deferral duration may include multiple downlink data 908 transmissions. The method 1300 may continue at operation 1316 with the STAs 1310 transmitting ACK or BA to the AP 102 in response to the DATA 1308.

Figure 14:
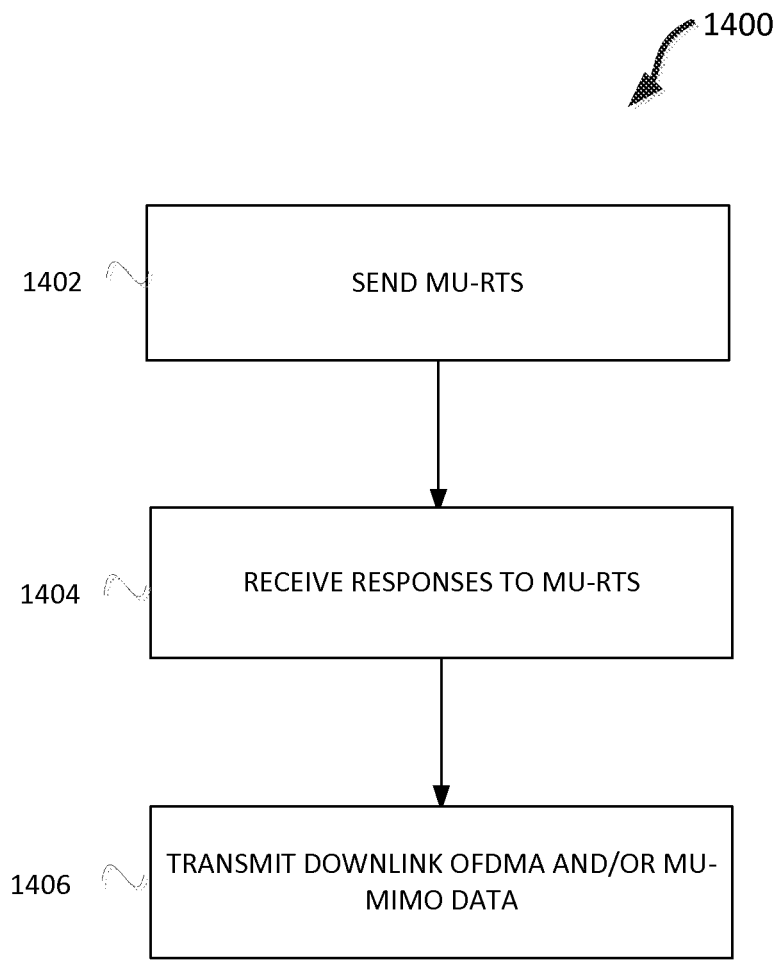
FIG. 14 illustrates a method of MU RTS/CTS downlink OFDMA and/or MU-MIMO, according to example embodiments.

FIG. 14 illustrates a method 1400 of MU RTS/CTS downlink OFDMA and/or MU-MIMO, according to example embodiments. The method 1400 begins at operation 1402 with send MU-RTS.

For example, the AP 102 may send MU-RTS 700 (as described in conjunction with FIG. 7) or MU-RTS 800 (as described in conjunction with FIG. 8) to HEW devices 104A, 104B, and 104C (as described in conjunction with FIG. 5). In example embodiments, the AP 102 may send MU-RTS 602 to STAs 610 (as described in conjunction with FIG. 6). In example embodiments, the AP 102 may send MU-RTS operation 902 to STAs 910 (as described in conjunction with FIG. 9). In example embodiments, the AP 102 may send MU-RTS operation 1302 to STAs 1310 (as described in conjunction with FIG. 13).

The method 1400 may continue at operation 1404 with receive responses to MU-RTS. For example, the AP 102 may receive STAs respond 1304 (as described in conjunction with FIG. 13). In example embodiments, the AP 102 may receive a response in MU-CTS phase 2 906 (as described in conjunction with FIG. 9). The response may be as illustrated in FIG. 10, FIG. 11, or FIG. 12. In example embodiments, the AP 102 may receive MU-CTS 604 (as described in conjunction with FIG. 6).

The method 1400 may continue at operation 1406 with transmit downlink OFDMA and/or MU-MIMO data. For example, the AP 102 may transmit data 1308 (as described in conjunction with FIG. 13). In example embodiments, the AP 102 may transmit data 908 (as described in conjunction with FIG. 9). In example embodiments, the AP 102 may transmit data 606 (as described in conjunction with FIG. 6).

The method 1400 may continue with the AP 102 receiving ACKs or BAs. For example, the AP 102 may receive ACK 1316 (as described in conjunction with FIG. 13). In example embodiments, the AP 102 may receive ACK 916 (as described in conjunction with FIG. 9). In example embodiments, the AP 102 may receive ACK 616 (as described in conjunction with FIG. 6).

Figure 15:
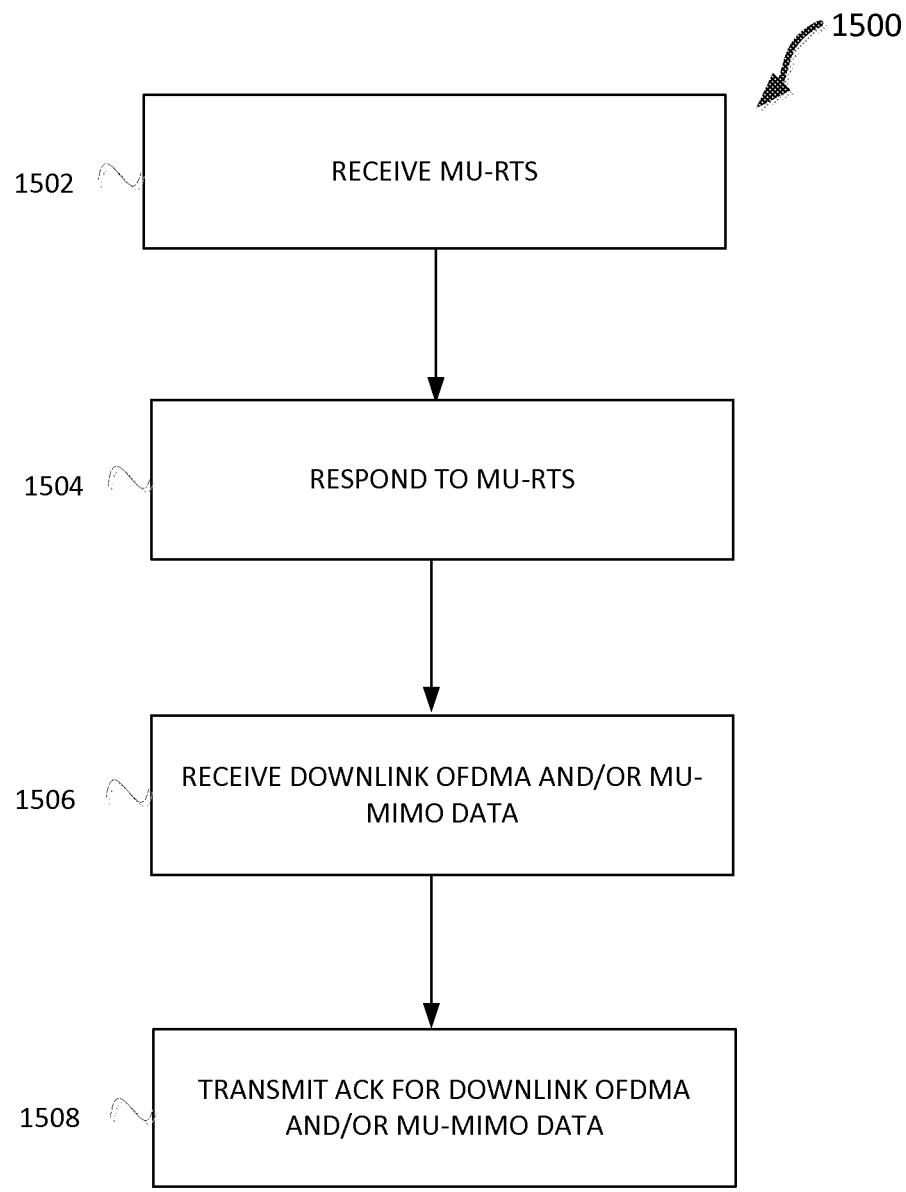
FIG. 15 illustrates a method of MU RTS/CTS downlink OFDMA and/or MU-MIMO, according to example embodiments.

FIG. 15 illustrates a method 1500 of MU RTS/CTS downlink OFDMA and/or MU-MIMO, according to example embodiments. The method 1500 begins at operation 1502 with receive MU-RTS. In example embodiments, the HEW device 104 may receive MU-RTS operation 1302 (as described in conjunction with FIG. 13). In example embodiments, the HEW device 104 may receive MU-RTS operation 902 (as described in conjunction with FIG. 9). In example embodiments, the HEW device 104 may receive MU-RTS 602 (as described in conjunction with FIG. 6).

The method 1500 may continue at operation 1504 with respond to MU-RTS. In example embodiments, the HEW device 104 may respond to MU-RTS operation 1302 by STAs respond 1304 (as described in conjunction with FIG. 13). Moreover, the HEW device 104 may respond to MU-CTS trigger operation 1306 with a CTS trigger operation 1307 (as described in conjunction with FIG. 13). In example embodiments, the HEW device 104 may receive MU-RTS operation 902 and respond with MU-CTS phase 1 operation 904 and MU-CTS phase 2 operation 906 (as described in conjunction with FIG. 9). In example embodiments, the HEW device 104 may receive MU-RTS 602 and respond as by sending MU-CTSs 604 (as described in conjunction with FIG. 6).

The method 1500 may continue at operation 1506 with receive downlink OFDMA and/or MU-MIMO data. In example embodiments, the HEW device 104 may receive data 1308 (as described in conjunction with FIG. 13). In example embodiments, the HEW device 104 may receive data 908 (as described in conjunction with FIG. 9). In example embodiments, the HEW device 104 may receive data 606 (as described in conjunction with FIG. 6).

The method 1500 may continue at operation 1508 with transmit ACK (or BA) for downlink OFDMA and/or MU-MIMO data. In example embodiments, the HEW device 104 may transmit ACK 1316 (as described in conjunction with FIG. 13). In example embodiments, the HEW device 104 may transmit ACK 916 (as described in conjunction with FIG. 9). In example embodiments, the HEW device 104 may transmit ACK 616 (as described in conjunction with FIG. 6).

Figure 16:
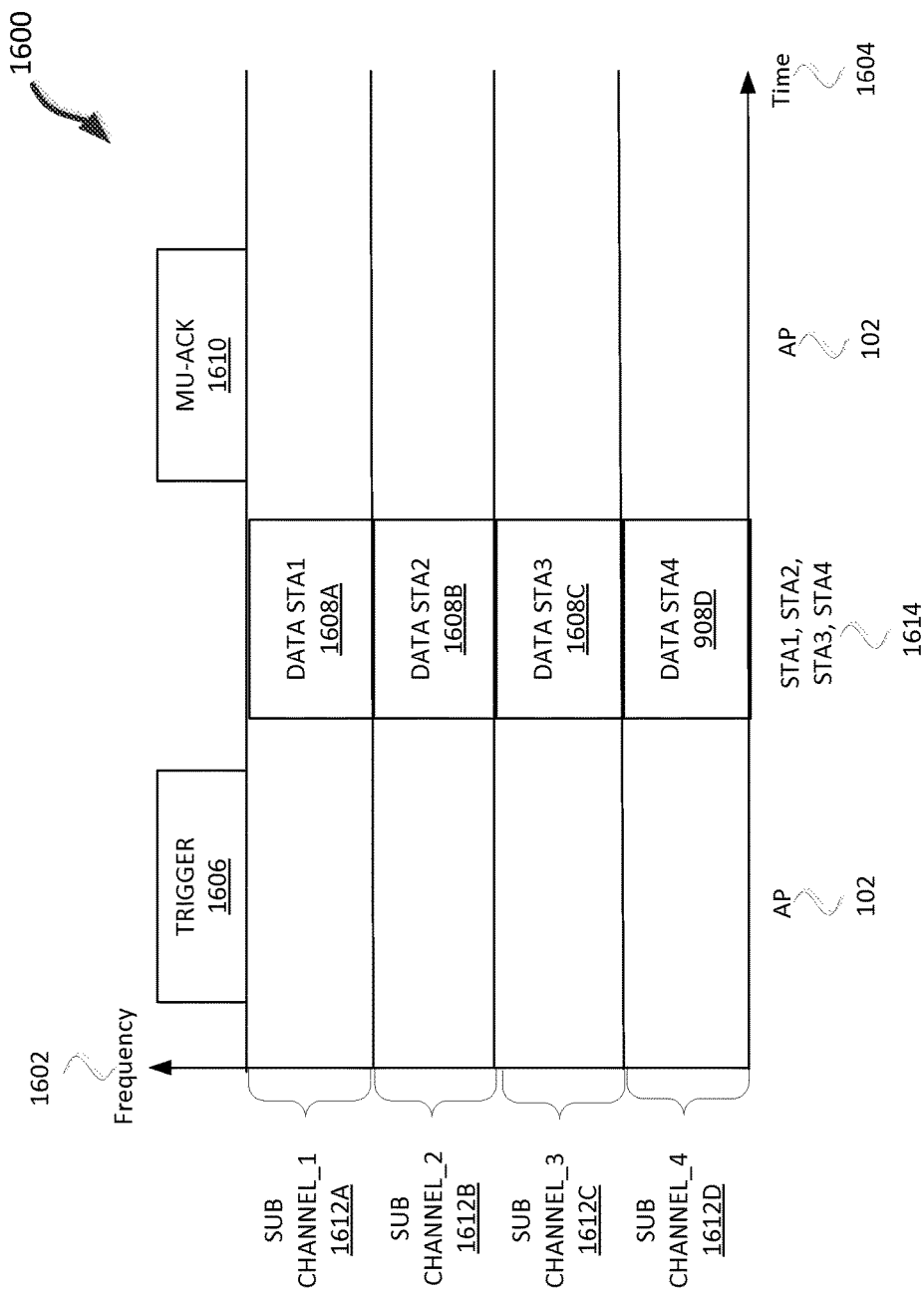
FIG. 16 illustrates a method for uplink OFDMA and/or MU-MIMO, according to example embodiments.

FIG. 16 illustrates a method 1600 for uplink OFDMA and/or MU-MIMO, according to example embodiments. Illustrated along the vertical axis is frequency 1602 and illustrated along the horizontal axis is time 1604. As illustrated, there are four sub-channels 1612. A different number of sub-channels 1612 may be used. The AP 102 may transmit the trigger 1606 frame which may include resource allocation for STAs 1614. The trigger 1606 frame may include a duration that indicates how long devices should defer before the uplink OFDMA and/or MU-MIMO is over. The STAs 1614 may transmit data 1608 to the AP 102. The STAs 1614 may transmit data 1608. The data 1608 may include a L-SIG that has a duration that indicates how long device should defer before the MU-ACK 1610 is over. The STAs 1614 may determine the duration based on the duration that is received in the trigger 1606 frame. The AP 102 may transmit the MU-ACK 1610. The STAs 1614 transmitting a duration that is past the MU-ACK 1610 may lessen or solve the problem of the hidden node 108. For example, in FIG. 5, AP 102 may transmit the trigger 1606 frame to HEW device 104A. Hidden node 108A may not receive the trigger 1606 frame since it is past the transmission range 502 of the AP 102. The hidden node 108A may then transmit when the AP 102 is transmitting the MU-ACK 1610. The STAs 1614, including a duration that indicates that devices should defer until after the MU-ACK 1610 may be received by the hidden nodes 108 (such as hidden node 108A), and the hidden nodes 108 may then defer until the MU-ACK 1610 has been transmitted.

Figure 17:
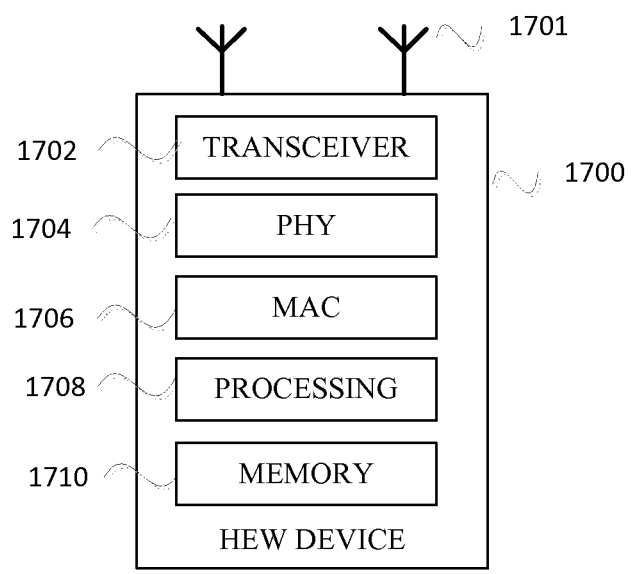
FIG. 17 illustrates a HEW device, in accordance with some embodiments.

FIG. 17 illustrates a HEW device in accordance with some embodiments. HEW device 1700 may be an HEW compliant device that may be arranged to communicate with one or more other HEW devices, such as HEW devices 104 (FIG. 1) or access point 102 (FIG. 1) as well as communicate with legacy devices 106 (FIG. 1). HEW devices 104 and legacy devices 106 may also be referred to as HEW stations (STAs) and legacy STAs, respectively. HEW device 1700 may be suitable for operating as access point 102 (FIG. 1) or as HEW device 104 (FIG. 1). In accordance with embodiments, HEW device 1700 may include, among other things, a transmit/receive element 1701 (for example, an antenna), a transceiver 1702, physical layer (PHY) circuitry 1704 and media-access control layer circuitry (MAC) 1706. PHY 1704 and MAC 1706 may be HEW compliant layers and may also be compliant with one or more legacy IEEE 802.11 standards. MAC 1706 may be arranged to configure PPDUs and arranged to transmit and receive PPDUs, among other things. HEW device 1700 may also include other circuitry 1708 and memory 1710 configured to perform the various operations described herein. The circuitry 1708 may be coupled to the transceiver 1702, which may be coupled to the transmit/receive element 1701. While FIG. 17 depicts the circuitry 1708 and the transceiver 1702 as separate components, the circuitry 1708 and the transceiver 1702 may be integrated together in an electronic package or chip.

In some embodiments, the MAC 1706 may be arranged to contend for a wireless medium during a contention period to receive control of the medium for the HEW control period and configure an HEW PPDU. In some embodiments, the MAC 1706 may be arranged to contend for the wireless medium based on channel contention settings, a transmitting power level, and a CCA level.

The PHY 1704 may be arranged to transmit the HEW PPDU. The PHY 1704 may include circuitry for modulation/demodulation, upconversion/downconversion, filtering, amplification, etc. In some embodiments, the circuitry 1708 may include one or more processors. The circuitry 1708 may be configured to perform functions based on instructions being stored in a RAM or ROM, or based on special purpose circuitry. In some embodiments, the circuitry 1708 is configured to perform one or more of the functions and/or methods described herein in conjunction with FIGS. 1-16 for performing downlink OFDMA and/or MU-MIMO with a RTS/CTS portion and/or for performing an uplink OFDMA and/or MU-MIMO where the uplink portion includes a duration for devices 1700 not participating in the uplink OFDMA and/or MU-MIMO to defer for the duration.

In some embodiments, two or more antennas 1701 may be coupled to the PHY 1704 and arranged for sending and receiving signals including transmission of the HEW packets. The HEW device 1700 may include a transceiver 1702 to transmit and receive data 1608 such as HEW PPDU and packets that include an indication that the HEW device 1700 should adapt the channel contention settings according to settings included in the packet. The memory 1710 may store information for configuring the other circuitry 1708 to perform operations for configuring and transmitting HEW packets and performing the various operations described herein and in conjunction with FIGS. 1 and 2.

In some embodiments, the HEW device 1700 may be configured to communicate using OFDM communication signals over a multicarrier communication channel. In some embodiments, HEW device 1700 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the embodiments is not limited in this respect, as they may also be suitable to transmit and/or receive communications in accordance with other techniques and standards. In some embodiments, the HEW device 1700 may use 4× symbol duration of 802.11n or 802.11 ac.

In some embodiments, an HEW device 1700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point 102, a television, a medical device (e.g., a heart rate monitor, a blood pressure monitor, etc.), a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas 1701, a graphics processor, an application processor, speakers, and other mobile device elements. The display may be an LCD screen including a touch screen.

The antennas 1701 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1701 may be effectively separated to take advantage of spatial diversity and the different channel characteristics that may result.

Although the device 1700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry 1708 for performing at least the functions described herein. In some embodiments, the functional elements may refer to one or more processes operating on one or more processing elements.

The following examples pertain to further embodiments. Example 1 is a high-efficiency (HE) wireless local-area network (HEW) master device. The HEW master device may include circuitry configured to generate a multi-user (MU) request to send (RTS) packet for a plurality of stations (STAs), the RTS packet to include an indication of an address for each of the plurality of STAs, and transmit the MU-RTS to the plurality of STAs. The circuitry may be further configured to transmit data to one or more of the plurality of STAs in accordance with at least one from the following group: orthogonal frequency division multi-user (OFDMA) and multi-user multiple-input multiple-output (MU-MIMO), and receive acknowledgements from the one or more of the plurality of STAs.

In Example 2, the subject matter of Example 1 can optionally include where the circuitry is further configured to transmit the MU-RTS to the plurality of STAs on one from the following group: a primary 20 MHz sub-channel, an entire operating bandwidth, and each of a plurality of 20 MHz sub-channels.

In Example 3, the subject matter of Example 2 can optionally include where the circuitry may be further configured to generate a second MU-RTS packet for the plurality of STAs, and before the transmit data, transmit the second MU-RTS packet to the plurality of STAs.

In Example 4, the subject matter of any of Examples 1-3 can optionally include where at least one from the following group includes a resource map that indicates a resource allocation for each of the plurality of STAs: the MU-RTS packet and a preamble to the data.

In Example 5, the subject matter of Example 4 can optionally include where the circuitry is further configured to: receive responses to the MU-RTS packet from the one or more of the plurality of STAs.

In Example 6, the subject matter of Example 5 can optionally include where the circuitry may be further configured to: where the responses are received in accordance with one of the following group: the resource allocation and a tone map.

In Example 7, the subject matter of Example 6 can optionally include where the one or more of the plurality of STAs is fewer STAs than the plurality of STAs, and wherein the circuitry may be further configured to transmit data to the one or more of the plurality of STAs in accordance with at least one from the following group: OFDMA and MU-MIMO, using an increased power level.

In Example 8, the subject matter of Example 6 can optionally include where the one or more of the plurality of STAs is fewer than the plurality of STAs, and wherein the circuitry may be further configured to increase an allocation for the one or more of the plurality of STAs.

In Example 9, the subject matter of Example 6 can optionally include where the MU-RTS packet includes an assignment of one or more tones for each of the plurality of HEW devices to use to transmit a response. The circuitry may be further configured to: receive responses to the MU-RTS packet from the one or more of the plurality of STAs on the corresponding assignment of the one or more tones.

In Example 10, the subject matter of Example 9 can optionally include where each of the responses is a legacy preamble followed by a HEW preamble, and where a deferral duration in the legacy preamble is based on a deferral duration in the MU-RTS.

In Example 11, the subject matter of any of Examples 1-10 can optionally include where the MU-RTS packet comprises a legacy portion that comprises an indication for wireless devices to defer transmitting until after one from the following group: the acknowledgements are received and after a multiple downlink data transmission.

In Example 12, the subject matter of any of Examples 1-11 can optionally include where each of the one or more of the plurality of STAs transmits a clear-to-send (CTS) after it receives the MU-RTS, and wherein a deferral duration in the CTS is based on a deferral duration in the MU-RTS.

In Example 13, the subject matter of any of Examples 1-12 can optionally include where the MU-RTS is one from the following group: a control frame, a management frame, a control wrapper frame, and a Institute of Electrical and Electronic Engineers (IEEE) 802.11 ax trigger frame.

In Example 14, the subject matter of any of Examples 1-13 can optionally include memory and a transceiver coupled to the circuitry.

In Example 15, the subject matter of Example 1 can optionally include one or more antennas coupled to the transceiver.

In Example 16 is a method on a high-efficiency (HE) wireless local-area network (HEW) master device. The method may include generating a multi-user (MU) request to send (RTS) packet for a plurality of stations (STAs). The RTS packet may include an indication of an address for each of the plurality of STAs. The method may further include transmitting the MU-RTS to the plurality STAs, and transmitting data to one or more of the plurality of STAs in accordance with at least one from the following group: orthogonal frequency division multi-user (OFDMA) and multi-user multiple-input multiple-output (MU-MIMO). The method may further include receiving acknowledgements from the one or more of the plurality of STAs.

In Example 17, the subject matter of Example 16 can optionally include where the MU-RTS packet includes at least one from the following group: resource map that indicates a resource allocation for each of the plurality of STAs and an assignment of one or more tones for each of the plurality of HEW devices to use to transmit a response.

In Example 18, the subject matter of Example 17 can optionally include where the method further includes receiving responses to the MU-RTS packet from the one or more of the plurality of STAs in accordance with one from the following group: the resource allocation or the assignment of one or more tones.

Example 19 is a high-efficiency (HE) wireless local-area network (HEW) device. The HEW device may include circuitry configured to receive a multi-user (MU) request to send (RTS) packet from a HEW master device, where the RTS packet is to include a plurality of indications of HEW device addresses. The circuitry may be further configured to determine that an address of the HEW device is indicated by one of the plurality of indications of HEW device addresses, and generate a clear-to-send (CTS) packet with a deferral duration that is based on a deferral duration in the MU-RTS. The circuitry may be further configured to transmit the CTS, and receive data from the HEW master device in accordance with at least one from the following group: orthogonal frequency division multiple-access (OFDMA) and multi-user multiple-input multiple-output (MU-MIMO). The circuitry may be further configured to transmit an acknowledgement to the HEW master device of the data.

In Example 20, the subject matter of Example 19 can optionally include where the CTS packet is one from the following group: a legacy CTS packet, a HEW CTS packet, a packet with a length field of a physical layer set to defer wireless devices beyond the packet, and a packet with a media access control length field set to defer wireless devices beyond the packet, and where the deferral duration in the MU-RTS is one from the following group: a duration for a single transmission of data and a duration for multiple transmissions of data, and where the circuitry may be further configured to transmit the MU-CTS on one from the following group: a primary 20 MHz sub-channel, an entire operating bandwidth, a channel on which the HEW master station is to transmit the data, and each of a plurality of 20 MHz sub-channels.

In Example 21, the subject matter of Example 20 can optionally include where the MU-RTS comprises an indication of tones or a sub-channel to transmit the response to the MU-RTS. The circuitry may be further configured to: transmit to the HEW master device the response to the MU-RTS on the tones or the sub-channel, and where the transmit is either before the transmit the CTS or after the transmit the CTS.

In Example 22, the subject matter of any of Examples 19-21 can optionally include wherein the MU-RTS further comprises a resource map. The circuitry may be further configured to receive data from the HEW master device in accordance with at least one from the following group: OFDMA and MU-MIMO and in accordance with the resource map.

In Example 23, the subject matter of any of Examples 19-22 can optionally include memory and a transceiver coupled to the circuitry, and one or more antennas coupled to the transceiver.

Example 24 is a non-transitory computer-readable storage medium that stores instructions for execution by one or more processors of a HEW master device configured for at least one of: downlink multi-user multiple-input multiple-output (MU-MIMO) and downlink orthogonal frequency multi-access (OFDMA) transmissions. The operations may configure the one or more processors to configure the HEW master station to: generate a multi-user (MU) request to send (RTS) packet for a plurality of stations (STAs), the RTS packet to include an indication of an address for each of the plurality of STAs, transmit the MU-RTS to the plurality STAs, transmit data to one or more of the plurality of STAs in accordance with at least from the following group: orthogonal frequency division multi-user (OFDMA) and multi-user multiple-input multiple-output (MU-MIMO), and receive acknowledgements from the one or more of the plurality of STAs.

In Example 25, the subject matter of Example 24 can optionally include where the operations further configure the one or more processor to configure the HEW master device to: receive responses to the MU-RTS packet from the one or more of the plurality of STAs.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point (AP), the apparatus comprising: memory; and
    processing circuitry' coupled to the memory, the processing circuitry' configured to:
    encode a trigger frame for multi-user request-to-send (MU-RTS), the trigger frame comprising for each of a plurality of HE stations (STAs), an association identification (AID) of a HE station (STA) and a corresponding channel allocation for the HE STA identified by the AID, wherein the trigger frame indicates each of the plurality' of HE STAs are to simultaneously respond with a CTS frame on each 20 MHz subchannel indicated in the corresponding channel allocation; and generate signaling to cause the HE AP to transmit the trigger frame;
    wherein the trigger frame further comprises a duration field, wherein a value of the duration field is set to a duration to indicate a deferral duration for wireless devices not participating in the MU-RTS
    wherein the plurality of HE STAs are to encode a value of a duration field of the CTS frames based on the value of the duration field of the trigger frame.

2. The apparatus of claim 1, wherein the processing circuitry is further configured to: decode CTS frames from the plurality of HE STAs in accordance with the trigger frame.

3. The apparatus of claim 1, wherein the trigger frame further comprises a receiver address field, wherein a value of the receiver address field is set to a broadcast address.

4. The apparatus of claim 1, wherein the plurality of TIE STAs are to respond with legacy CTS frames.

5. The apparatus of claim 4, wherein the plurality of HE STAs are to transmit CTS frames in accordance with an Institute of Electrical and Electronic Engineering (IEEE) 802.1 la or IEEE 802.1 lb.

6. The apparatus of claim 1, wherein the HE STAs are to transmit the CTS frames a short interframe space (SIFS) after receiving the trigger frame.

7. The apparatus of claim 1, wherein the processing circuitry is further configured to:
    encode a data frame for the plurality of HE STAs, the data frame comprising a resource map, the resource map indicating resource units for the plurality of HE STAs to receive the data; and generate signaling to transmit the data to the plurality of STAs in accordance with at least one from the following group: orthogonal frequency division multiple access (OFDMA) and multiuser multiple-input multiple-output (MU-MIMO).

8. The apparatus of claim 1, wherein the channel indicates a bandwidth from 20 MHz channel to 160 MHz.

9. The apparatus of claim 1, wherein the processing circuitry is further configured to: encode the trigger frame to further comprise a legacy signal field (L-SIG), the L-SIG field comprising a length field with a value of the length field set to indicate a deferral duration for wireless devices not participating in the MU-RTS.

10. The apparatus of claim 1, wherein the HE AP and each of the plurality of HE STAs is one from the following group: an Institute of Electrical and Electronic Engineers (IEEE) 802,1 lax access point, an IEEE 802.1 lax STA, an IEEE 802.11 STA, and an IEEE 802.11 access point.

11. The apparatus of claim 1, further comprising: transceiver circuitry coupled to the processing circuitry, and one or more antennas coupled to the transceiver circuitry.

12. A non-transitory computer-readable storage medium that stores instructions for execution by one or more processors of an apparatus of a high efficiency (HE) access point (AP), the instructions to configure the one or more processors to: encode a trigger frame for multi-user request-to-send (MU-RTS), the trigger frame comprising for each of a plurality' of HE stations (STAs), an association identification (AID) of a HE station (STA) and a corresponding channel allocation for the HE STA identified by the AID, wherein the trigger frame indicates each of the plurality of HE STAs are to simultaneously respond with a CTS frame on each 20 MHz subchannel indicated in the corresponding channel allocation; and generate signaling to cause the HE AP to transmit the trigger frame;
    wherein the trigger frame further comprises a duration field, wherein a value of the duration field is set to a duration to indicate a deferral duration for wireless devices not participating in the MU-RTS
    wherein the plurality of HE STAs are to encode a value of a duration field of the CTS frames based on the value of the duration field of the trigger frame.

13. The non-transitory computer-readable storage medium of claim 12, wherein the instructions to further configure the one or more processors to:
    decode CTS frames from the plurality' of HE STAs in accordance with the trigger frame.

14. A method performed by an apparatus of a high efficiency (HE) access point (AP), the method comprising:
    encoding a trigger frame for multi-user request-to-send (MU-RTS), the trigger frame comprising for each of a plurality of HE stations (STAs), an association identification (AID) of a HE station (STA) and a corresponding channel allocation for the HE STA identified by the AID, wherein the trigger frame indicates each of the plurality of HE STAs are to simultaneously respond with a CTS frame on each 20 MHz subchannel indicated in the corresponding channel allocation, and generating signaling to cause the HE AP to transmit the trigger frame;
    wherein the trigger frame further comprises a duration field, wherein a value of the duration field is set to a duration to indicate a deferral duration for wireless devices not participating in the MU-RTS
    wherein the plurality of HE STAs are to encode a value of a duration field of the CTS frames based on the value of the duration field of the trigger frame.

15. The method of claim 14, the method further comprising: decoding CTS frames from the plurality of HE STAs in accordance with the trigger frame.

16. An apparatus of a first high-efficiency (HE) station (STA), the apparatus comprising: memory; and processing circuitry coupled to the memory, the processing circuitry configured to: decode a trigger frame for multi-user request-to-send (MU-RTS), the trigger frame comprising for each of a plurality of second HE STAs, an association identification (.AID) of a second HE STA and an indication of a channel for the second HE STA to transmit a clear-to-send (CTS) frame, wherein the trigger frame indicates the plurality of second HE STAs are to simultaneously transmit CTS frames on each 20 MHz subchannel of the channel indicated by a corresponding indication of the channel; and in response to an AID of the first HE STA being equal to the AID of the second HE STA, generate signaling to cause the first HE STA to simultaneously transmit the CTS frame on each 20 MHz subchannel of the channel indicated by a corresponding indication of the channel;

wherein the trigger frame further comprises a duration field, wherein a value of the duration field is set to a duration to indicate a deferral duration for wireless devices not participating in the MU-RTS wherein the trigger frame further comprises a duration field, wherein a value of the duration field is set to a duration to extend to an end of a transmission opportunity (TXOP), the TXOP comprising the CTS frames, and wherein the first HE STA is to encode a value of a duration field of the CTS frame based on the value the duration field of the trigger frame.

17. The apparatus of claim 16, wherein the CTS frame is a legacy CTS frames.

18. The apparatus of claim 16, wherein the CTS frame is to be transmitted a short interframe space (SIFS) after receiving the trigger.

19. The apparatus of claim 16, wherein the processing circuitry is further configured to: decode a data frame from the HE AP on the channel, the data frame comprising a resource unit for the HE station to decode data for the HE station.

20. The apparatus of claim 16, wherein the CTS frame is to be transmitted in accordance with one or both of orthogonal frequency division multiple access (OFDM A).

21. The apparatus of claim 16, further comprising transceiver circuitry coupled to the processing circuitry; and one or more antennas coupled to the transceiver circuitry.

\* \* \* \* \*

UNITED STATES PATENT AND TRADEMARK OFFICE
CERTIFICATE OF CORRECTION

PATENT NO. : 10,396,952 B2
APPLICATION NO. : 14/669810
DATED : August 27, 2019
INVENTOR(S) : Huang et al.

It is certified that error appears in the above-identified patent and that said Letters Patent is hereby corrected as shown below:

In the Claims

In Column 17, Line 16, in Claim 1, after "comprising:", insert --¶--

In Column 17, Line 17, in Claim 1, delete "circuitry'" and insert --circuitry-- therefor In Column 17, Line 18, in Claim 1, delete "circuitry'" and insert --circuitry-- therefor In Column 17, Line 25, in Claim 1, delete "plurality'" and insert --plurality-- therefor In Column 17, Line 27, in Claim 1, after "and", insert --¶--

In Column 17, Line 33, in Claim 1, after "MU-RTS", insert --,--

In Column 17, Line 38, in Claim 2, after "to:", insert --¶--

In Column 17, Line 49, in Claim 5, delete "802.1 la or IEEE 802.1 lb." and insert --802.11a or IEEE 802.11b.-- therefor In Column 17, Line 58, in Claim 7, after "and", insert --¶--

In Column 17, Line 66, in Claim 9, after "to:", insert --¶--

In Column 18, Line 7, in Claim 10, delete "802,1 lax" and insert --802.11ax-- therefor In Column 18, Line 7, in Claim 10, delete "802.1 lax" and insert --802.11ax-- therefor In Column 18, Line 9, in Claim 11, after "comprising:", insert --¶--

In Column 18, Line 12, in Claim 12, delete "Anon-transitory" and insert --A non-transitory-- therefor Signed and Sealed this
Fourteenth Day of December, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,396,952 B2

In Column 18, Line 16, in Claim 12, after "to:", insert --¶--

In Column 18, Line 18, in Claim 12, delete "plurality'" and insert --plurality-- therefor In Column 18, Line 24, in Claim 12, after "and", insert --¶--

In Column 18, Line 29, in Claim 12, after "MU-RTS", insert --,--

In Column 18, Line 36, in Claim 13, delete "plurality'" and insert --plurality-- therefor In Column 18, Line 54, in Claim 14, after "MU-RTS", insert --,--

In Column 18, Lines 58-59, in Claim 15, after "comprising:", insert --¶--

In Column 18, Line 62, in Claim 16, after "comprising:", insert --¶--

In Column 18, Line 62, in Claim 16, after "and", insert --¶--

In Column 18, Line 64, in Claim 16, after "to:", insert --¶--

In Column 18, Line 67, in Claim 16, delete "(.AID)" and insert --(AID)-- therefor In Column 19, Line 14, in Claim 16, after "MU-RTS", insert --,--

In Column 20, Line 9, in Claim 19, after "to:", insert --¶--

In Column 20, Line 15, in Claim 20, delete "(OFDM A)." and insert --(OFDMA).-- therefor In Column 20, Line 17, in Claim 21, after "and", insert --¶--